US010185710B2

(12) United States Patent
Egi

(10) Patent No.: US 10,185,710 B2
(45) Date of Patent: Jan. 22, 2019

(54) TRANSLITERATION APPARATUS, TRANSLITERATION METHOD, TRANSLITERATION PROGRAM, AND INFORMATION PROCESSING APPARATUS

(71) Applicant: Rakuten, Inc., Tokyo (JP)

(72) Inventor: Satoshi Egi, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 15/519,284

(22) PCT Filed: Jun. 30, 2015

(86) PCT No.: PCT/JP2015/068828
§ 371 (c)(1),
(2) Date: Apr. 14, 2017

(87) PCT Pub. No.: WO2017/002199
PCT Pub. Date: Jan. 5, 2017

(65) Prior Publication Data
US 2017/0228360 A1   Aug. 10, 2017

(51) Int. Cl.
*G06F 17/27* (2006.01)
*G06F 17/28* (2006.01)

(52) U.S. Cl.
CPC ........ *G06F 17/274* (2013.01); *G06F 17/2735* (2013.01); *G06F 17/2863* (2013.01)

(58) Field of Classification Search
CPC ............. G06F 17/2217; G06F 17/2863; G06F 17/2223; G06F 3/018; G06F 3/0481;
(Continued)

(56) References Cited

U.S. PATENT DOCUMENTS 9,176,936 B2 * 11/2015 Jan ..................... G06F 17/2223
2003/0074185 A1 * 4/2003 Kang .................. G06F 17/2863
704/2
(Continued)

FOREIGN PATENT DOCUMENTS

JP      10-143514 A    5/1998
JP    2003-263429 A    9/2003
(Continued)

OTHER PUBLICATIONS

International Preliminary Report on Patentability with a Translation of Written Opinion issued from the International Bureau in counterpart International Application No. PCT/JP2015/068828, dated Jan. 11, 2018.
(Continued)

*Primary Examiner* — Abdelali Serrou
(74) *Attorney, Agent, or Firm* — Sughrue Mion, PLLC

(57) ABSTRACT

A transliteration processing device according to one embodiment includes a character string acquisition unit that acquires a first alphabetic character string representing by alphabet a first word written in a first language having a specified script and a second alphabetic character string representing by alphabet a second word written in a second language having a different script from the first language, a determination unit that makes a determination whether a first consonant element included in the first alphabetic character string and a second consonant element included in the second alphabetic character string have a predetermined correspondence, and determines whether the first word and the second word have a transliteration relationship based on a result of the determination, and an output unit that outputs, as a transliteration pair, the first word and the second word determined to have a transliteration relationship by the determination unit.

7 Claims, 10 Drawing Sheets

(58) Field of Classification Search
CPC .............. G06F 17/2818; G06F 17/2872; G06F 17/2264; G06F 17/2294; G06F 17/273; G06F 17/28; G06F 17/2276; G06F 17/2735; G06F 17/274; G06F 17/2755; G06F 17/2827; G06F 17/289
See application file for complete search history.

(56) References Cited

U.S. PATENT DOCUMENTS

| | | | |
|---|---|---|---|
| 2003/0195741 A1* | 10/2003 | Mani ................... | G06F 17/2863 704/8 |
| 2005/0216253 A1* | 9/2005 | Brockett ............. | G06F 17/2818 704/5 |
| 2007/0055493 A1* | 3/2007 | Lee ..................... | G06F 17/2795 704/9 |
| 2007/0124133 A1* | 5/2007 | Wang .................. | G06F 17/2818 704/10 |
| 2008/0221866 A1* | 9/2008 | Katragadda ......... | G06F 17/2223 704/8 |
| 2008/0270111 A1* | 10/2008 | Hanumanthappa ......................... G06F 17/2223 704/3 |
| 2010/0094614 A1* | 4/2010 | Bilac ................... | G06F 17/2863 704/2 |
| 2011/0170927 A1* | 7/2011 | Ahn ........................ | G06F 3/018 400/484 |
| 2013/0035926 A1* | 2/2013 | Ushakov ................. | G06F 17/28 704/2 |
| 2013/0151234 A1* | 6/2013 | Huang .................... | G06F 3/018 704/8 |
| 2013/0191115 A1* | 7/2013 | Suzuki .................... | G10L 21/06 704/9 |
| 2013/0246042 A1* | 9/2013 | Hagiwara ........... | G06F 17/2223 704/2 |
| 2014/0095143 A1* | 4/2014 | Jan ....................... | G06F 17/2223 704/2 |
| 2015/0057993 A1* | 2/2015 | Phadke ................. | G06F 17/289 704/3 |

FOREIGN PATENT DOCUMENTS

| | | | |
|---|---|---|---|
| JP | 2007-156545 | * | 6/2007 |
| JP | 2007-156545 A | | 6/2007 |
| WO | 2012/121063 A1 | | 9/2012 |

OTHER PUBLICATIONS

Yoshihiro Matsuo et al., "Using Pronunciation to Automatically Extract Bilingual Word Pairs", Information Processing Society of Japan, Nov. 19, 1996, pp. 101-106, vol. 96, No. 114.
International Search Report for PCT/JP2015/068828 dated Aug. 11, 2015.

* cited by examiner

↓ str1 = "BOJOREE"

↓

A = { ["B" "O"], ["J" "O"], ["R" "EE"] }

(b)

w2 = 「BEAUJOLAIS」

↓ str2 = "BEAUJOLAIS"

↓

B = { ["B" "EAU"], ["J" "O"], ["L" "AI"], ["S" ""] }

*Fig.6*
(a)
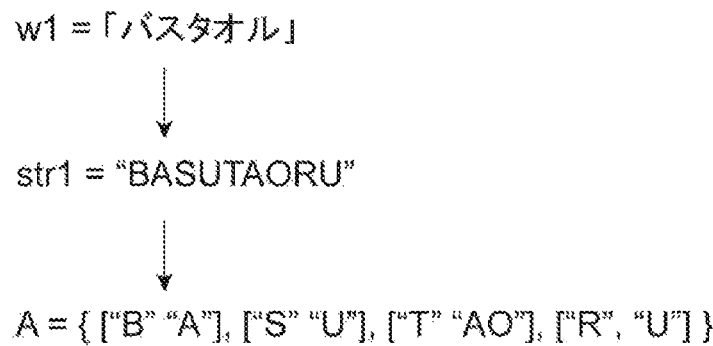
(b)
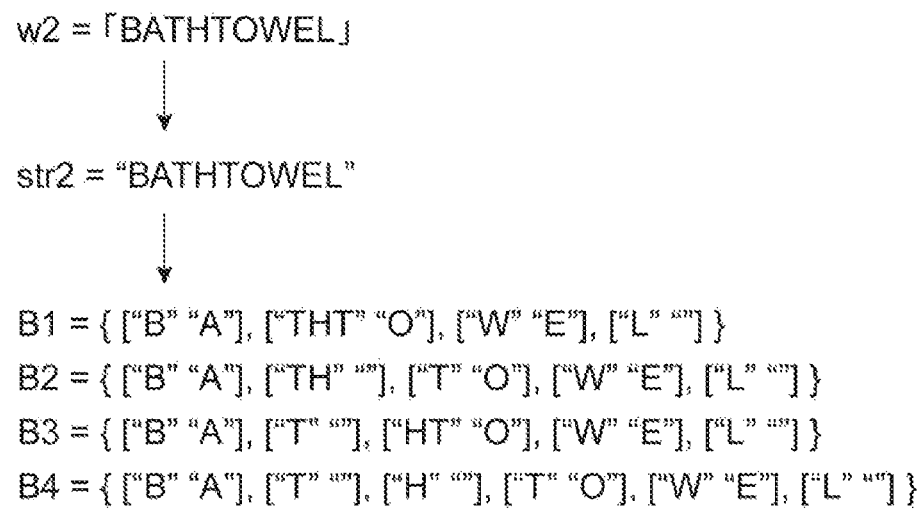

| CONSONANT ELEMENT IN JAPANESE (ROMAN LETTERS) | CONSONANT ELEMENT IN ENGLISH |
|---|---|
| "B", "BY" | "V", "VV", "W", "B", "BB", "BH", "BJ", "BY" |
| "CH" | "T", "TT", "TCH", "CH", "CCH", "C", "CC" |
| "D", "DY" | "D", "DD", "DH", "T", "DY", "DJ" |
| "R", "RY" | "L", "LL", "R", "RR", "RY", "LY", "GL", "TL", "LH", "RH", "SL", "DL", "GR" |
| "T" | "CH", "TS", "TTS", "TZ", "T", "TT", "TH", "DT", "CHT", "D" |
| ... | ... |

(b)

"U" ⟷ × ⟷ "A", "I" (except for "IU", "IEU")

TRANSLITERATION APPARATUS, TRANSLITERATION METHOD, TRANSLITERATION PROGRAM, AND INFORMATION PROCESSING APPARATUS

CROSS REFERENCE TO RELATED APPLICATIONS

This application is a National Stage of International Application No. PCT/JP2015/068828 filed Jun. 30, 2015, the contents of all of which are incorporated herein by reference in their entirety.

TECHNICAL FIELD

One aspect of the present invention relates to a transliteration processing device, a transliteration processing method, a transliteration processing program, and an information processing device.

BACKGROUND ART

Transliteration dictionary data where pairs of word written in one language (for example, Japanese) and words written in another language having a transliteration relationship with those words (which are referred to hereinafter as "transliteration pairs") are registered is used in various applications. For example, the transliteration dictionary data is used when making a product search with a keyword entered by a user on a website (EC site) that sells products (including services) on the Internet.

For example, when "ボジョレー" in Japanese Katakana is entered as a search keyword in the above-described product search, a computer that performs the product search refers to the transliteration dictionary data and can thereby show, as search results, not only web pages containing the Japanese Katakana word "ボジョレー" but also web pages containing the alphabetical word "Beaujolais" having a transliteration relationship with the Japanese Katakana word "ボジョレー".

Such transliteration dictionary data has been created (that is, transliteration pairs have been registered in the transliteration dictionary data) by hand or by machine learning based on learning data prepared in advance (for example, see Patent Literature 1 below).

CITATION LIST

Patent Literature

PTL1: Japanese Unexamined Patent Publication No. 2007-156545

SUMMARY OF INVENTION

Technical Problem

However, in the case of creating the above-described transliteration dictionary data by hand (i.e., when a person determines whether or not a word in one language has a transliteration relationship with a word in another language on a word-by-word basis), it takes a lot of time and effort. On the other hand, in the case of creating the above-described transliteration dictionary data by machine learning, it is difficult to prepare learning data (i.e., transliteration pairs that are determined to have a transliteration relationship with each other) for creating appropriate transliteration rules in a comprehensive manner. This is because it is difficult to know in advance what learning rules would be needed for use in machine learning to create appropriate transliteration rules. Thus, in order to increase the efficiency of creating the transliteration dictionary data, it is demanded to efficiently detect transliteration pairs.

Solution to Problem

A transliteration processing device according to one aspect of the present invention includes a character string acquisition unit configured to acquire a first alphabetic character string that represents by alphabet a first word written in a first language having a specified script and a second alphabetic character string that represents by alphabet a second word written in a second language having a different script from the first language; a determination unit configured to make a determination as to whether a first consonant element included in the first alphabetic character string and a second consonant element included in the second alphabetic character string have a predetermined correspondence, and determine whether the first word and the second word have a transliteration relationship based on a result of the determination; and an output unit configured to output, as a transliteration pair, the first word and the second word determined to have a transliteration relationship by the determination unit.

A transliteration processing method according to one aspect of the present invention is a transliteration processing method performed by at least one processor, the method including a character string acquisition step of acquiring a first alphabetic character string that represents by alphabet a first word written in a first language having a specified script and a second alphabetic character string that represents by alphabet a second word written in a second language having a different script from the first language; a determination step of making a determination as to whether a first consonant element included in the first alphabetic character string and a second consonant element included in the second alphabetic character string have a predetermined correspondence, and determining whether the first word and the second word have a transliteration relationship based on a result of the determination; and an output step of outputting, as a transliteration pair, the first word and the second word determined to have a transliteration relationship in the determination step.

A transliteration processing program according to one aspect of the present invention causes a computer to execute a character string acquisition step of acquiring a first alphabetic character string that represents by alphabet a first word written in a first language having a specified script and a second alphabetic character string that represents by alphabet a second word written in a second language having a different script from the first language; a determination step of making a determination as to whether a first consonant element included in the first alphabetic character string and a second consonant element included in the second alphabetic character string have a predetermined correspondence, and determining whether the first word and the second word have a transliteration relationship based on a result of the determination; and an output step of outputting, as a transliteration pair, the first word and the second word determined to have a transliteration relationship in the determination step.

According to the above-described aspects, it is determined whether a first word written in a first language and a second word written in a second language have a transliteration relationship or not based on a result of a determination as to whether a first consonant element included in a first alphabetic character string and a second consonant element included in a second alphabetic character string have a predetermined correspondence. In this manner, by determining whether words written in languages having different scripts from each other have a transliteration relationship or not by paying attention to the correspondence between consonant elements included in alphabetic character strings that represent the respective words by alphabet, it is possible to efficiently detect transliteration pairs.

Advantageous Effects of Invention

According to one aspect of the present invention, it is possible to efficiently detect transliteration pairs.

BRIEF DESCRIPTION OF DRAWINGS

FIG. 5 is a view showing an example of processing of a word acquisition unit, a character string acquisition unit and a dividing unit.

FIG. 6 is a view showing an example of processing of a word acquisition unit, a character string acquisition unit and a dividing unit.

FIG. 7 is a view showing an example of a consonant rule and a prohibition rule.

DESCRIPTION OF EMBODIMENTS

Figure 1:
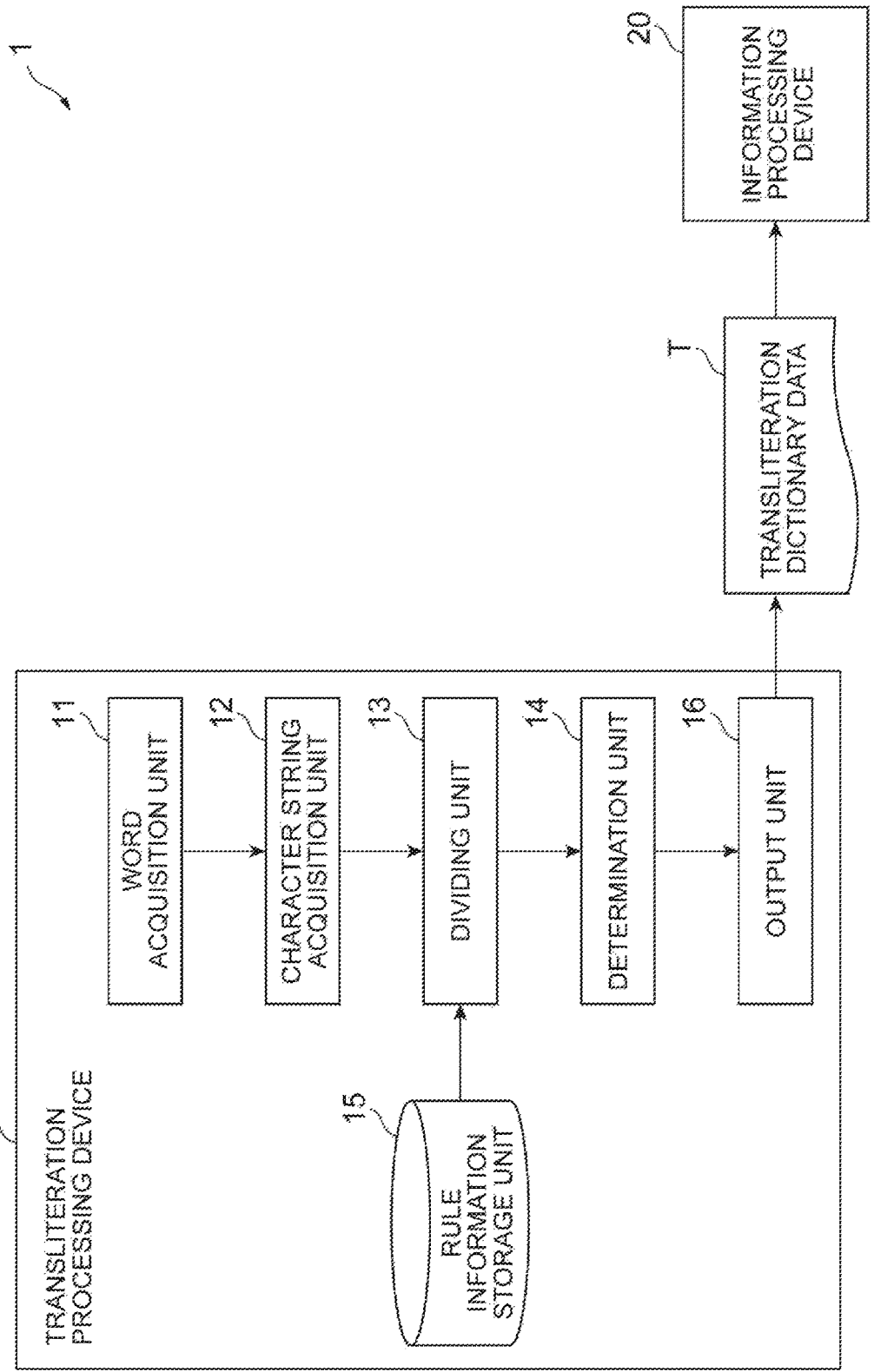
FIG. 1 is a view showing the functional configuration of an information processing system that includes a transliteration processing device according to an embodiment.

An embodiment of the present invention is described hereinafter in detail with reference to the appended drawings. Note that, in the description of the drawings, the same or equivalent elements are denoted by the same reference symbols, and the redundant explanation thereof is omitted.

The functions and configuration of an information processing system 1 that includes a transliteration processing device 10 according to an embodiment are described hereinafter with reference to FIGS. 1 to 7. The information processing system 1 includes the transliteration processing device 10 and an information processing device 20.

The transliteration processing device 10 is a device that determines whether a first word written in a first language having a specified script and a second word written in a second language having a different script from the first language have a transliteration relationship or not, and outputs a pair of words determined to have a transliteration relationship as a transliteration pair. To be more specific, the transliteration processing device 10 acquires a first alphabetic character string that represents the first word by alphabet and a second alphabetic character string that represents the second word by alphabet. The transliteration processing device 10 then determines whether the first word and the second word have a transliteration relationship based on a result of a determination as to whether a consonant element included in the first alphabetic character string and a consonant element included in the second alphabetic character string have a predetermined correspondence.

"Script" means the classification category of written languages (letters) used in the world. Specific examples of the script are classification categories such as Latin, Arabic, Greek, Cyrillic, Chinese characters, Kana, Hangul and the like. Further, "a certain language 'a' has a certain script 'b'" means that the classification category of letters used in the language 'a' is the script 'b'. For example, English, French, German and the like that use Latin alphabet have a Latin script. Likewise, Russian has a Cyrillic script, Chinese has a Chinese script, and Japanese has Kanji and Kana scripts (Hiragana and Katakana).

Letters that are "represented by alphabet" means overall letters in a phoneme characters where each letter represents the phoneme of a consonant or a vowel. Although a Latin writing system using 26 Latin letters from "A" to "Z" is used as one example of the representation by alphabet in this embodiment, the alphabetic system can be the concept that includes writing systems using letters other than Latin, such as Greek and Cyrillic, for example.

"Alphabetic character string 'x' that represents a word 'w' in a certain language 'a' by alphabet" is the same character string as the word 'w' when the word 'w' is written in alphabet (which is, in Latin in this embodiment as described above; the same applies below) (for example, when the language a is English or the like). On the other hand, when the word 'w' is not written in alphabet (e.g., when the language 'a' is Japanese, and the word 'w' is written in Katakana etc.), the above-described alphabetic character string 'x' is a character string that is obtained by converting the word 'w' into an alphabetic system (e.g., Roman letters etc.).

"Transliteration" means converting letters written in one script to letters in another script. Note that one letter written in one script may be converted to one or more letters written in another script, and two or more letters written in one script may be converted to one or more letters written in another script.

When a word W1 in one language L1 and a word W2 in another language L2 having a different script from the language L1 "have a transliteration relationship", it means that the word W2 is a word that is obtained by transliterating the word W1 (that is, the word W2 is a word obtained by converting the word W1 into the writing system of the language L2) and the reverse is also true. For example, because the Katakana word "ボジョレー" is a word that is obtained by converting the alphabetical word "Beaujolais" into Katakana, "ボジョレー" in Katakana and "Beaujolais" in alphabet have a transliteration relationship. "Transliteration pair" means a pair of words having a transliteration relationship with each other. For example, a pair of "ボジョレー" in Katakana and "Beaujolais" in alphabet are a transliteration pair.

In this embodiment, in one example, the transliteration processing device 10 determines whether a word in Katakana (first word; which is referred to hereinafter as "Katakana word") written in Japanese (first language) and a word in alphabet (second word; which is referred to hereinafter as "English word") written in English (second language) have a transliteration relationship or not. Note that, however, a pair of languages for which the transliteration processing device 10 makes a determination as to whether there is a transliteration relationship or not is not limited to the above example, and any pair of languages in a different script from each other may be used. Note further that English words used as an example in this embodiment include a word that is derived from a language other than English (e.g., "Beaujolais" that is derived from French described above etc.).

Figure 2:
FIG. 2 is a view showing an example of transliteration dictionary data.

The information processing device 20 is a device that performs predetermined processing (which is described in detail later) by referring to transliteration dictionary data T in which the transliteration pairs output from the transliteration processing device 10 are registered. FIG. 2 shows an example of the transliteration dictionary data T. As shown in FIG. 2, the transliteration dictionary data T is data that contains a plurality of transliteration pairs composed of Katakana words and English words having a transliteration relationship with each other. A way of implementing the transliteration dictionary data T is not particularly limited. For example, the transliteration dictionary data T may be a text file passed from the transliteration processing device 10 to the information processing device 20, or may be a database that is managed by an arbitrary database management system. Note that, although Roman letters corresponding to the Katakana word (Katakana letters) are also written in the left column of the transliteration dictionary data T in FIG. 2, the Roman letters are not necessarily registered in the transliteration dictionary data T in actual processing.

The processing performed by the information processing device 20 by referring to the transliteration dictionary data T and its application are not particularly limited. Hereinafter, several examples of the processing performed by the information processing device 20 are described using the case where the information processing device 20 is implemented as a computer device that runs a web site (EC site) that sells products (including services) on the Internet as an example. Note that specific examples of "services" sold on the EC site are tour and accommodation booking, concert ticket booking, golf course booking and the like.

(First Example of Processing by the Information Processing Device)

The information processing device 20 may make a product search based on a search keyword that is entered by a user who uses the EC site by referring to the transliteration dictionary data T. As a specific example, the case where "ボジョレー" in Katakana is entered as a search keyword by a user is described below. Note that a system of writing used to represent the same product X may be different depending on seller who offers the product on the EC site. Specifically, the product X is written in Katakana "ボジョレー" in some web pages, and it is written in alphabet "Beaujolais", which has a transliteration relationship with "ボジョレー" in Katakana, in other web pages. "Web page" is document data that is stored in a portion that is accessible via a communication network such as the Internet. A web page contains HTML, style sheet, image data and the like, for example, and it is configured to be viewable by a web browser.

The information processing device 20 receives "ボジョレー" in Katakana entered by a user as a first search keyword, and further acquires "Beaujolais" in alphabet, which has a transliteration relationship with "ボジョレー" in Katakana, as a second search keyword, by referring to the transliteration dictionary data T. Then, the information processing device 20 presents, as search results, web pages showing products containing the first search keyword or the second search keyword to the user. It is thereby possible to provide the user who uses the EC site with more information about the product X which the user desires in one search operation (in this example, the operation that the user enters "ボジョレー" in Katakana as a search keyword). As a result, it is possible to improve the convenience of users who use the EC site. Further, shops that sell products on the EC site also have the merit that the sales opportunities of their products increase because the chances that the web pages showing the products sold by them are presented to users as search results increase. Further, because the number of searches by users can be reduced, it is possible to suppress the communication load by data entered by users, the processing load for a search process in the information processing device 20 and the like.

(Second Example of Processing by the Information Processing Device)

The information processing device 20 may perform processing of autocompleting the entry of characters by a user by referring to the transliteration dictionary data T. For example, when a user enters the Katakana word "ボジョレー" in a search form on the EC site or the like, "Beaujolais" in alphabet, which has a transliteration relationship with "ボジョレー" in Katakana, may be presented to the user as a candidate. The user can thereby enter the alphabetical word "Beaujolais" as a search keyword simply by selecting "Beaujolais" in alphabet that is presented as a candidate. Thus, even when it is necessary to enter "Beaujolais" in alphabet as a search keyword in order to search product web pages that contain the alphabetical word "Beaujolais" and the user does not know the spelling of "Beaujolais" in alphabet, for example, the user can easily make a desired search. As a result, it is possible to improve the convenience of users who use the EC site. Further, because the entry of a keyword with wrong spelling by users is reduced, it is possible to suppress the occurrence of an unnecessary search process.

(Third Example of Processing by the Information Processing Device)

The information processing device 20 may perform processing of determining whether products are the same or not by referring to the transliteration dictionary data T. For example, in the case where many sellers sell the same product X on the same EC site, the same product X is represented using different writing systems by different sellers in some cases. For example, there is a case where, for the same product X, some sellers use the Katakana word "ボジョレー", and other sellers use the alphabetical word "Beaujolais". In such a case, the information processing device 20 can refer to transliteration dictionary data T and thereby detect that "ボジョレー" in Katakana and "Beaujolais" in alphabet have a transliteration relation s with each other, and recognize that the Katakana word "ボジョレー" and the alphabetical word "Beaujolais" indicate the same product. As a result, the information processing device 20 can accurately calculate the total sales of the product X on the EC site, for example, by adding up the sales of the products with the Katakana word "ボジョレー" and the sales of the products with the alphabetical word "Beaujolais".

As described in the above first to third examples, the information processing device 20 can perform processing in accordance with various purposes by referring to the transliteration dictionary data T. Note that, however, the above-described first to third examples are just one example of processing using the transliteration dictionary data T. The information processing device 20 may perform processing other than those described in the first to third example by referring to the transliteration dictionary data T.

Figure 3:
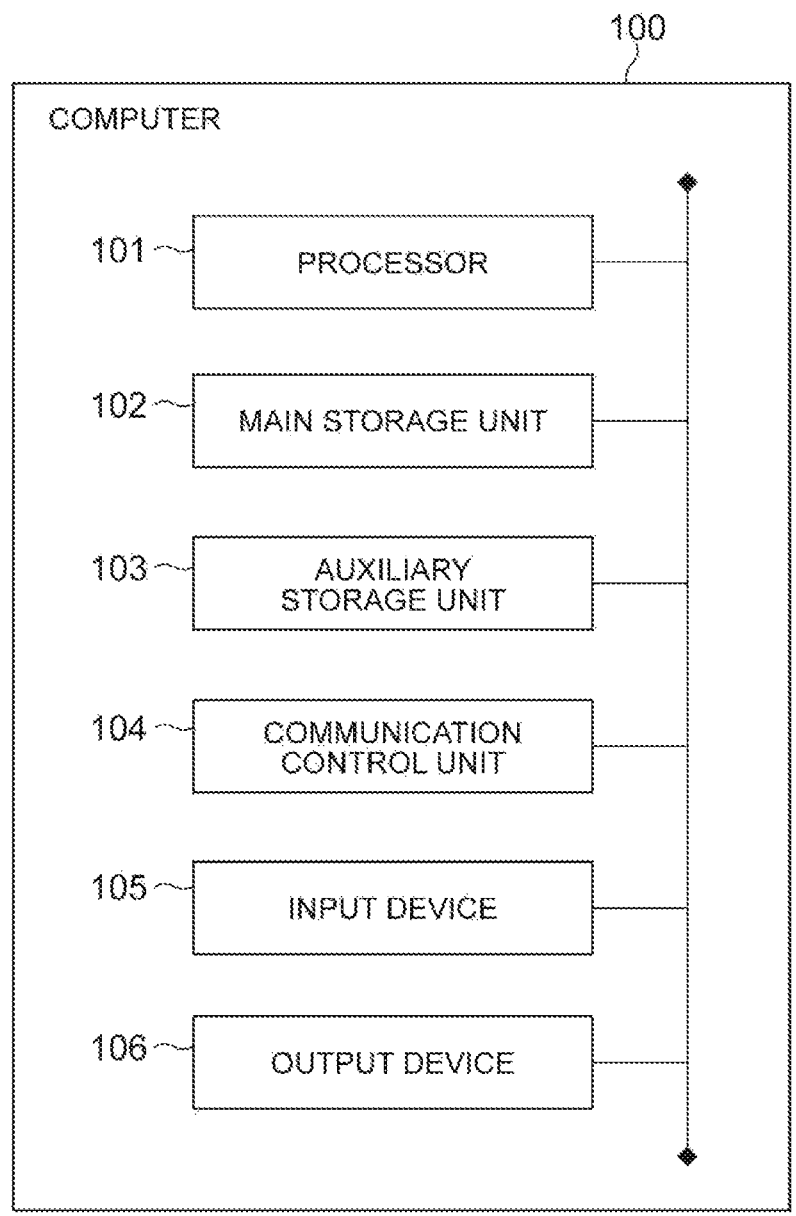
FIG. 3 is a view showing a hardware configuration of a computer used in an information processing system according to an embodiment.

FIG. 3 shows a typical hardware configuration of a computer 100 that functions as the transliteration processing device 10 or the information processing device 20. The computer 100 includes a processor (for example, CPU (Central Processing Unit)) 101 that executes an operating system, an application program and the like, a main storage unit 102 such as ROM (Read Only Memory) and RAM (Random Access Memory), an auxiliary storage unit 103 such as a hard disk or a flash memory, a communication control unit 104 such as a network card or a wireless communication module, an input device 105 such as a keyboard and a mouse, and an output device 106 such as a monitor. As a matter of course, hardware modules mounted thereon vary by the type of the computer 100.

The functional elements in the information processing system 1 are implemented by loading given software onto the processor 101 or the main storage device 102, making the communication control device 104, the input device 105, the output device 106 and the like operate under control of the processor 101, and performing reading and writing of data in the main storage device 102 or the auxiliary storage device 103. Data and database required for the processing is stored in the main storage device 102 or the auxiliary storage device 103.

Each of the transliteration processing device 10 and the information processing device 20 may be composed of a single computer 100 or a plurality of computers 100 that perform processing in a distributed manner. Further, the transliteration processing device 10 and the information processing device 20 may be composed of different computers 100 from each another or may be composed of the same computer 100.

As shown in FIG. 1, the transliteration processing device 10 includes, as functional elements, a word acquisition unit 11, a character string acquisition unit 12, a dividing unit 13, a determination unit 14, a rule information storage unit 15, and an output unit 16. The elements of the transliteration processing device 10 are described hereinafter.

The word acquisition unit 11 is a functional element that acquires a first word written in a first language having a specified script and a second word written in a second language having a different script from the first language. As described above, in this embodiment, the first language is Japanese having a Kana script, and the first word is a Katakana word represented by Katakana as an example. Further, the second language is English having a Latin script, and the second word is an English word represented by alphabet. Thus, the word acquisition unit 11 acquires a Katakana word w1 and an English word w2. The Katakana word w1 and the English word w2 acquired by the word acquisition unit 11 is passed to the character string acquisition unit 12, and it is determined whether they have a transliteration relationship through processing by the character string acquisition unit 12, the dividing unit 13 and the determination unit 14, which are described later.

The word acquisition unit 11 may acquire a plurality of one or both of the Katakana word w1 and the English word w2. In this case, the transliteration processing device 10 may perform processing by the character string acquisition unit 12, the dividing unit 13 and the determination unit 14, which are described later, for all pairs of the Katakana word w1 and the English word w2. It is thereby possible to automatically detect a pair of words having a transliteration relationship out of a plurality of pairs of the Katakana word w1 and the English word w2 acquired by the word acquisition unit 11.

The word acquisition unit 11 may receive text information contained in an arbitrary web page published on the Internet as entry, for example, and may acquire a word in Katakana contained in the text information as the Katakana word w1 and acquire a word in alphabet contained in the text information as the English word w2.

The text information contained in the same web page is likely to contain a Katakana word and an English word that represent the same concept (for example, an object name represented by a loan word, a foreign place name, a foreign person name etc.) by Katakana and alphabet, respectively. In other words, the text information contained in the same web page is likely to contain a Katakana word and an English word having a transliteration relationship. Therefore, by acquiring the Katakana word w1 and the English word w2 for which it is determined whether they have a transliteration relationship or not from the text information contained in the same web page, it will be possible to efficiently detect transliteration pairs.

Figure 4:
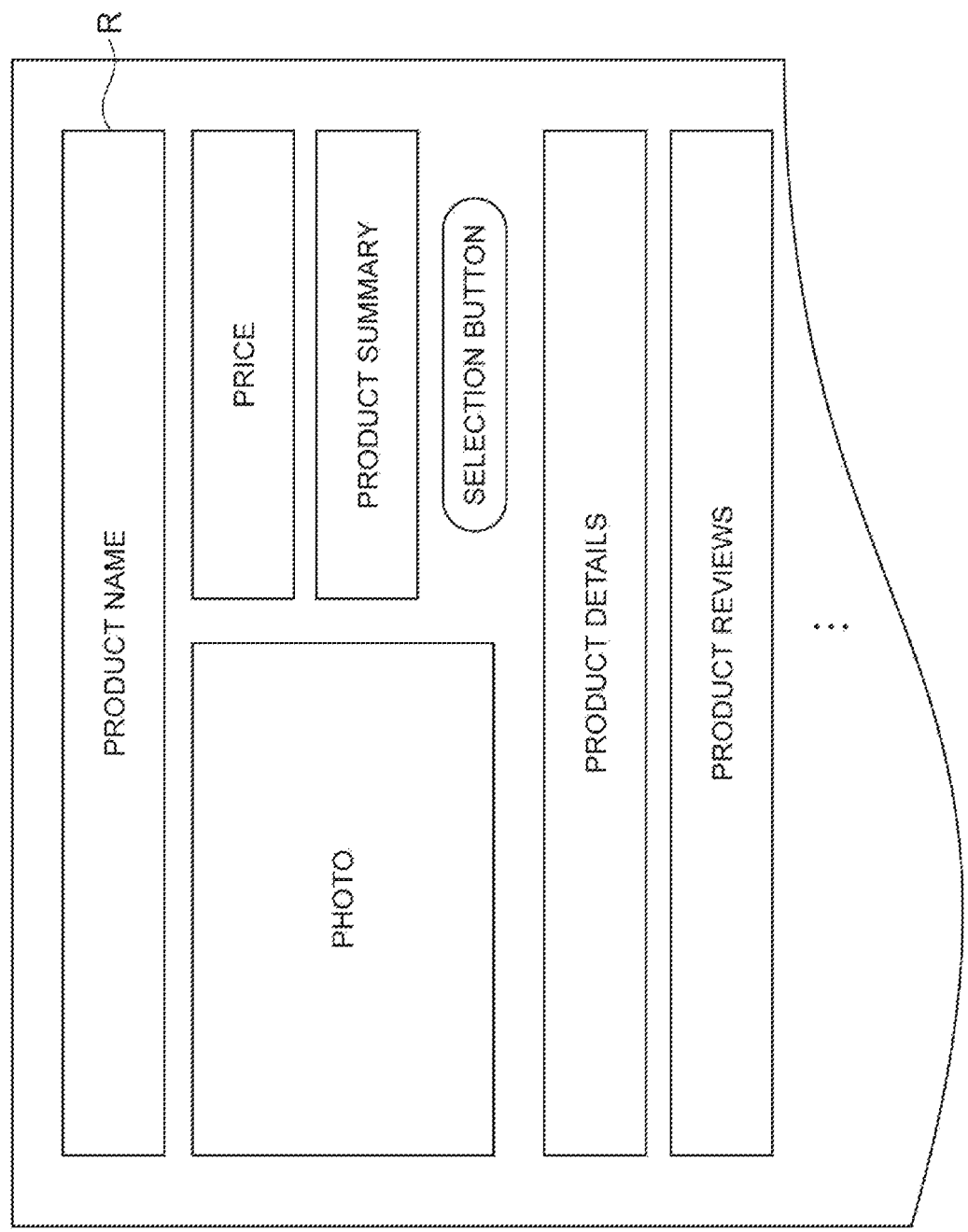
FIG. 4 is a view showing an example of the structure of a webpage of an EC site.

Further, as shown in FIG. 4, a web page that offers a product or a service on the EC site (which is referred to hereinafter as "product page") is typically provided with dedicated regions such as a product photo, price, summary, details, reviews, and a selection button for selecting the product as a candidate for purchase and further provided with a dedicated region for showing a product or service name (product name region R).

In the case where a product or service name is represented by Katakana (for example, when a product or service name is based on an object name represented by a loan word, a foreign place name, a foreign person name etc.), it is likely that the product or service name is written both in Katakana and alphabet in the product name region R. This is because it is preferred that a product page on the EC site is viewed by as many users as possible. In other words, the administrator of a product page (for example, the seller of a product or service shown on the product page) desires that their product page matches as many search keywords as possible on a web page search on the Internet. For such a reason, it is likely that both of the Katakana and alphabetical versions of a product or service name are written in the product name region R.

Thus, the word acquisition unit 11 may specify the product name region R (a portion where a product or service name is shown) in a product page of the EC site, and may acquire a word in Katakana contained in the product name region R as the Katakana word w1 and acquire a word in alphabet contained in the product name region R as the English word w2. It is thereby possible to extract the Katakana word w1 and the English word w2 that are likely to have a transliteration relationship and efficiently detect a transliteration pair. Note that, although the word acquisition unit 11 may specify the product name region R in any way, the word acquisition unit 11 may specify the product name region R by referring to layout information (e.g., information described in HTML etc.) indicating the layout of the product page, for example.

Note that, however, the way the word acquisition unit 11 acquires the Katakana word w1 and the English word w2 is not limited to the above example. For example, the word acquisition unit 11 may receive as entry a pair (or a set) of the Katakana word w1 and the English word w2 that have been prepared in advance by the operator of the transliteration processing device 10.

The character string acquisition unit 12 is a functional element that acquires a first alphabetic character string that represents the first word by alphabet and a second alphabetic character string that represents the second word by alphabet. To be more specific, the character string acquisition unit 12 is a functional element that converts the first word and the second word (which are the Katakana word w1 and the English word w2 as an example in this embodiment) acquired by the word acquisition unit 11 to alphabetic character strings according to need.

The processing performed by the character string acquisition unit 12 is described using the example in which the Katakana word w1 is "ボジョレー" in Katakana and the English word w2 is "BEAUJOLAIS" in alphabet as shown in FIG. 5. Note that, although all English words are in upper case in the following description in this embodiment, the English word w2 can include lower case letters as a matter of course. Note that, in the case where the English word w2 includes lower case letters, the character string acquisition unit 12 may convert all the lower case letters included in the English word w2 into upper case letters in order to simplify the character string processing by use of only upper case letters. The character string acquisition unit 12 may convert a lower case letter included in the English word w2 into an upper case letter corresponding to the lower case letter by referring to a conversion table indicating the correspondence between upper case letters and lower case letters which has been prepared in advance, for example. Further, in the case of simplifying the character string processing by use of only lower case letters, the character string acquisition unit 12 may convert all upper case letters included in the English word w2 into lower case letters by the same way as described above.

As shown in (a) of FIG. 5, the character string acquisition unit 12 converts the Katakana word w1 into a Roman character string (first alphabetic character string) str1 represented by Roman letters (by alphabet). The character string acquisition unit 12 can convert Katakana characters included in the Katakana word w1 into Roman letters corresponding to the Katakana characters by referring to a conversion table indicating the correspondence between Katakana characters and Roman letters which has been prepared in advance, for example. In the example of (a of FIG. 5, the character string acquisition unit 12 converts "ボ", "ジョ", "レ" and "(I)—" in Katakana into "BO", "JO", "RE" and "E" in Roman letters, respectively, by performing the conversion processing using the above-described conversion table, and thereby acquires the Roman character string str1 "BOJOREE".

On the other hand, in this embodiment, the English word w2 is already represented by alphabet as shown in (b) of FIG. 5. Thus, the character string acquisition unit 12 acquires the English word w2 acquired by the word acquisition unit 11 as an English character string (second alphabetic character string) str2 without any conversion.

The dividing unit 13 is a functional element that generates a Roman array (first array) A from the Roman character string str1 and generates an English array (second array) B from the English character string str2. To be specific, the dividing unit 13 divides the Roman character string str1 at the boundary where a vowel letter is followed by a consonant letter, and generates the Roman array A where divided elements are arranged in order of appearance in the Roman character string str1. Further, the dividing unit 13 divides the English character string str2 at the boundary where a vowel letter is followed by a consonant letter, and generates the English array B where divided elements are arranged in order of appearance in the English character string str2.

When there is no boundary where a vowel letter is followed by a consonant letter in the Roman character string str1 or the English character string str2, the dividing unit 13 may generate the Roman array A or the English array B having the original Roman character string str1 or English character string str2 as a single element. An example of a character string with no boundary where a vowel letter is followed by a consonant letter is a character string having one consonant element and one vowel element, such as "de".

"Vowel letters" are letters that represent a vowel in alphabet. As described earlier, because the alphabet uses the Latin script as an example in this embodiment, the vowel letters are "A", "I", "U", "E" and "O". On the other hand, "consonant letters" are letters that represent a consonant (which are letters other than vowel letters) in alphabet. Specifically, the consonant letters are 21 letters excluding the above-described five vowel letters from 26 letters from "A" to "Z".

The Roman array A and the English array B generated by the dividing unit 13 are described hereinafter with reference to FIGS. 5 and 6. Note that the form of arrays described below is just one example, and it does not limit a specific data structure of arrays generated by the dividing unit 13.

(First Example of Processing by the Dividing Unit)

A first example of processing by the dividing unit 13 is described hereinafter with reference to FIG. 5. As shown in (a) of FIG. 5, the dividing unit 13 divides the Roman character string str1 ("BOJOREE") at the boundary where a vowel letter is followed by a consonant letter and thereby divides it into three elements "BO", "JO" and "REE".

Such dividing processing is performed as follows, for example. Specifically, the dividing unit 13 stores in advance information of letters that are vowel letters (which is referred to hereinafter as "vowel letter information"). Then, the dividing unit 13 reads the Roman character string str1 to be processed one letter by one letter from the beginning, and determines whether the read letter is a vowel letter or a consonant letter by referring to the vowel letter information. When the dividing unit 13 determines that a letter after the letter that has been determined to be a vowel letter is a consonant letter, it divides the Roman character string str1 at the boundary between the letter determined to be a vowel letter and the letter determined to be a consonant letter.

The dividing unit 13 further sorts the divided elements to vowel elements and consonant elements and arranges them in order of appearance in the Roman character string str1, and thereby generates the Roman array A (={["B" "O"], ["J" "O"], ["R" "EE"]}). "Consonant element" means a character string consisting of one or more consonant letters, and "vowel element" means a character string consisting of one or more vowel letters.

On the other hand, as shown in (b) of FIG. 5, the dividing unit 13 divides the English character string str2 ("BEAUJOLAIS") at the boundary where a vowel letter is followed by a consonant letter in the same way as the above-described processing on the Roman character string str1, and thereby divides it into four elements "BEAU", "JO", "LAI" and "S". The dividing unit 13 further sorts the divided elements to vowel elements and consonant elements and arranges them in order of appearance in the English character string str2, and thereby generates the English array B (={["B" "EAU"], ["J" "O"], ["L" "AI"], ["S" " "]}).

The way of representing a array used in this specification is described hereinafter. As shown in FIG. 5, in this specification, the array is represented by showing each element of the array in the brackets [ ] and arranging the elements constituting the array in a comma-delimited format in the brackets { }. The left part in the brackets [ ] is a consonant element included in the element, and the right part in the brackets [ ] is a vowel element included in the element. In the element with no vowel element, the right part in the brackets [ ] is a null character (" "), and in the element with no consonant element, the left part in the brackets [ ] is a null character (" "). Further, in the following description, the i-th element of the array X is represented by X[i].

(Second Example of Processing by the Dividing Unit)

A second example of processing by the dividing unit 13 is described hereinafter with reference to FIG. 6. In the example of FIG. 6, the Katakana word w1 acquired by the word acquisition unit 11 is "バスタオル" in Katakana, and the English word w2 acquired by the word acquisition unit 11 is "BATHTOWEL" in alphabet. In this case, the character string acquisition unit 12 acquires the Roman character string str1 ("BASUTAORU") from the Katakana word w1 and acquires the English character string str2 ("BATHTOWEL") from the English word w2.

As shown in (a) of FIG. 6, the dividing unit 13 divides the Roman character string str1 ("BASUTAORU") at the boundary where a vowel letter is followed by a consonant letter and thereby divides it into four elements "BA", "SU", "TAO" and "RU". The dividing unit 13 further sorts the divided elements to vowel elements and consonant elements and arranges them in order of appearance in the Roman character string str1, and thereby generates the Roman array A (={["B" "A"], ["S" "U"], ["T" "AO"], ["R" "U"]}).

On the other hand, as shown in (b) of FIG. 6, the dividing unit 13 divides the English character string str2 ("BATHTOWEL") at the boundary where a vowel letter is followed by a consonant letter, and thereby divides it into four elements "BA", "THTO", "WE" and "L". The dividing unit 13 further sorts the divided elements to vowel elements and consonant elements and arranges them in order of appearance in the English character string str2, and thereby generates the English array B1 (={["B" "A"], ["THT" "O"], ["W" "E"], ["L" " "]}).

The second element B1[2] (=["THT" "O"]) of the English array B1 includes the consonant element ("THT") consisting of a plurality of consonant letters (in this example, three consonant letters "T", "H", "T"). In this case, the dividing unit 13 generates arrays B2 to B4 which correspond to the dividing patterns that further divide the element B1[2] to two or more elements. To be more specific, the dividing unit 13 generates the English arrays B2 to B4 which correspond to all possible dividing patterns for the consonant element "THT" included in the element B1[2].

As shown in (b) of FIG. 6, the English array B2 (={["B" "A"], ["TH" " "], ["T" "O"], ["W" "E"], ["L" " "]}) is a array which corresponds to the dividing pattern that divides the consonant element "THT" included in the element B1[2] of the English array B1 to "TH" and "T". In other words, the English array B2 is a array that is obtained by dividing the element B1[2] of the English array B1 to the element B2[2] (=["TH" " "]) and the element B3[2] (=["T" "O"]).

The English array B3 (={["B" "A"], ["T" " "], ["HT" "O"], ["W" "E"], ["L" " "]}) is a array which corresponds to the dividing pattern that divides the consonant element "THT" included in the element B1[2] of the English array B1 to "T" and "HT". In other words, the English array B3 is a array that is obtained by dividing the element B1[2] of the English array B1 to the element B3[2] (=["T" " "]) and the element B3[3] (=["HT" "O"]).

The English array B4 (={["B" "A"], ["T" " "], ["H" " "], ["T" "O"], ["W" "E"], ["L" " "]}) is a array which corresponds to the dividing pattern that divides the consonant element "THT" included in the element B1[2] of the English array B1 to "T", "H" and "T". In other words, the English array B4 is a array that is obtained by dividing the element B1[2] of the English array B1 to the element B4[2] (=["T" " "]), the element B4[3] (=["H" " "]) and the element B4[4] (=["T" "O"]).

The determination unit 14 is a functional element that makes a determination as to whether a consonant element (first consonant element) included in the Katakana character string str1 and a consonant element (second consonant element) included in the English character string str2 have a predetermined correspondence, and determines whether the Katakana word w1 and the English word w2 have a transliteration relationship or not based on a result of the determination. Further, the rule information storage unit 15 is a functional element that stores a consonant rule indicating the correspondence between consonant elements used in Japanese represented by Roman letters and consonant elements used in English represented by alphabetical letters. The determination unit 14 makes the above-described determination by referring to the consonant rule stored in the rule information storage unit 15.

(a) of FIG. 7 shows an example of the consonant rule. The consonant rule shown in (a) of FIG. 7 indicates that consonant elements in Roman letters and consonant elements in English respectively shown in the left and right parts of the same row have a correspondence. This consonant rule indicates that consonant elements in Roman letters ("B", "BY") and consonant elements in English ("V", "VV", "W", "B", "BB", "BH", "BJ", "BY") have a correspondence with each other.

When "a consonant element c1 in Roman letters and a consonant element c2 in English letters have a correspondence", it means that, in a pair of a word in Roman letters and a word in English letters which represent the same concept (i.e., a word in Roman letters and a word in English letters having a transliteration relationship), the consonant element c1 in Roman letters is represented by the consonant element c2 in English letters in some cases (alternatively, the consonant element c2 in English letters is represented by the consonant element c1 in Roman letters in some cases).

To prepare such a consonant rule, an operator or the like may perform the following processing by hand, for example. Specifically, the pronunciation of each of several English words is represented by Katakana, and further the Katakana characters are converted into Roman letters. Then, a consonant element in the English word and a consonant element in the Roman letters which correspond to the same pronunciation point are compared with each other, thereby extracting a pair of consonant elements having a correspondence with each other. In one example, the case of extracting a pair of consonant elements having a correspondence from "VIBRATION", which is an English word, and "BAIBUREESHON", which is Japanese in Roman letters corresponding to the English word, is described hereinbelow.

In this case, by comparing the parts corresponding to the pronunciation points "BA" and "BU" in "BAIBUREESHON" in Roman letters, the consonant element "B" in Roman letters and the consonant elements "B" and "V" in English are extracted as a pair of consonant elements having a correspondence. Further, by comparing the parts corresponding to the pronunciation point "RE" in Roman letters, the consonant element "R" in Roman letters and the consonant element "R" in English are extracted as a pair of consonant elements having a correspondence. Furthermore, by comparing the parts corresponding to the pronunciation point "SHO" in Roman letters, the consonant element "SH" in Roman letters and the consonant element "T" in English are extracted as a pair of consonant elements having a correspondence. As a result of performing such extraction for a plurality of English words and their Romanized version, the consonant rule as shown in (a) of FIG. 7 is created.

Note that, the present inventor has found that, while the correspondence between vowel elements of a Katakana word and an English word having a transliteration relationship is complicated and difficult to be defined by rules, the correspondence between consonant elements can be defined by some limited number of rules. Based on such findings, the determination unit 14 makes a determination about the correspondence between consonant elements by referring to the consonant rule which is prepared in advance as shown in (a) of FIG. 7, thereby implementing the determination processing described as an example below. Hereinafter, first to fourth examples of the processing performed by the determination unit 14 are described.

(First Example of Processing by the Determination Unit)

In the first example, the determination unit 14 compares the elements of the Roman array A and the elements of the English array B one by one from the first element. When it is determined that a consonant element included in each element of the Roman array A and a consonant element included in each element of the English array B have a correspondence, the determination unit 14 determines that the Katakana word w1 and the English word w2 have a transliteration relationship.

The first example of the processing performed by the determination unit 14 is described hereinafter in detail using, as an example, the case where the Katakana word w1 and the English word w2 acquired by the word acquisition unit 11, the Roman character string str1 and the English character string str2 acquired by the character string acquisition unit 12, and the Roman array A and the English array B generated by the dividing unit 13 are as follows.

w1="プリムール" in Katakana
w2="PRIMEUR"
str1="PURIMUURU"
str2="PRIMEUR"
A={["P" "U"], ["R" "I"], ["M" "UU"], ["R" "U"]}
B={["P" " "], ["R" "I"], ["M" "EU"], ["R" " "]}

Further, it is assumed that the consonant rule stored in the rule information storage unit 15 at least includes a rule indicating that a pair of the consonant element "P" in Roman letters and the consonant element "P" in English letters have a correspondence, and so do a pair of the consonant element "R" in Roman letters and the consonant element "R" in English letters, and a pair of the consonant element "M" in Roman letters and the consonant element "M" in English letters.

In this case, the determination unit 14 compares the consonant element "P" in the first element A[1] of the Roman array A and the consonant element "P" in the first element B[1] of the English array B. By referring to the consonant rule, the determination unit 14 determines that those consonant elements have a correspondence. Then, the determination unit 14 compares the consonant element "R" in the second element A[2] of the Roman array A and the consonant element "R" in the second element B[2] of the English array B. By referring to the consonant rule, the determination unit 14 determines that those consonant elements have a correspondence.

After that, the determination unit 14 sequentially performs the same processing on the remaining elements until comparisons are done for all elements of the Roman array A and the English array B. The determination unit 14 thereby determines that the consonant element "M" in the third element A[3] of the Roman array A and the consonant element "M" in the third element B[3] of the English array B have a correspondence, and determines that the consonant element "R" in the fourth element A[4] of the Roman array A and the consonant element "R" in the fourth element B[4] of the English array B have a correspondence.

In this manner, when it is determined that a consonant element included in each element of the Roman array A and a consonant element included in each element of the English array B have a correspondence, the determination unit 14 determines that the Katakana word w1 and the English word w2 have a transliteration relationship.

On the other hand, when it is not determined that consonant elements have a correspondence in any of comparisons between a consonant element in each element of the Roman array A and a consonant element in each element of the English array B, the determination unit 14 determines that the Katakana word w1 and the English word w2 do not have a transliteration relationship. For example, when a pair of the consonant element in the second element A[2] of the Roman array A and the consonant element in the second element A[2] of the English array B is not included in the consonant rule as a pair of consonant elements having a correspondence (e.g., when the consonant element in the element A[2] is "B" and the consonant element in the element B[2] is "T" etc.), the determination unit 14 determines that the consonant element in the element A[2] and the consonant element in the element B[2] do not have a correspondence. As a result, the determination unit 14 determines that the Katakana word w1 and the English word w2 do not have a transliteration relationship.

Note that, for the reasons described earlier, when each consonant element included in an alphabetic character string in Roman letters and each consonant element included in an alphabetic character string in English letters have a correspondence, it is likely that the Katakana word w1 and the English word w2 have a transliteration relationship. Thus, by the processing of the determination unit 14 described above, it is possible to easily sort out whether the Katakana word w1 and the English word w2 have a transliteration relationship or not based on the correspondence between consonant elements, which enables efficient detection of transliteration pairs.

The effects of the above-described technique that determines transliteration pairs based on the correspondence between consonant elements are described in comparison with the case of performing machine learning. In the case of creating the transliteration dictionary data by machine learning, for example, machine learning with various learning data is needed by trial and error to create an appropriate transliteration rule (character conversion rule). This is due to the fact that it is difficult to know in advance what transliteration rule will be created by machine learning with what learning data, that an accurate transliteration rule is not necessarily created by merely increasing the learning data (there is a possibility that inadequate transliteration rule will be created due to over-learning) and the like. On the other hand, according to the above-described technique that determines transliteration pairs based on the correspondence between consonant elements, it is possible to sort out whether two words (the Katakana word w1 and the English word w2) to be compared have a transliteration relationship or not by the determination based on a predetermined consonant rule. There is thus no need for time and effort in machine learning as described above (selection of learning data, checking whether the transliteration rule obtained by machine learning is appropriate or not etc.).

(Second Example of Processing by the Determination Unit)

In the second example, the determination unit 14 excludes a consonant element that matches a predetermined condition out of consonant elements included in the Roman character string str1 and consonant elements included in the English character string str2, and makes the above-described determination on the remaining consonant elements.

There is a case where, when the Katakana word w1 and the English word w2 have a transliteration relationship, a consonant element corresponding to a consonant element that appears in the alphabetic character string of one word does not explicitly appear in the alphabetic character string of the other word. For example, a consonant element corresponding to a consonant element that appears in a specific way in the English character string str2 does not explicitly appear in the Roman character string str1 in some cases. Thus, the determination unit 14 extracts such a consonant element that appears in a specific way by a determination as to whether it matches a predetermined condition or not, and excludes the extracted consonant element, and can thereby more accurately determine whether the Katakana word w1 and the English word w2 have a transliteration relationship.

The second example of the processing performed by the determination unit 14 is described hereinafter in detail using, as an example, the case shown in FIG. 5 (the case where the Katakana word w1 is "ボジョレー" in Katakana and the English word w2 is "BEAUJOLAIS" in alphabet). In this case, it is assumed that the consonant rule stored in the rule information storage unit 15 at least includes a rule indicating that a pair of the consonant element "B" in Roman letters and the consonant element "B" in English letters have a correspondence, and so do a pair of the consonant element "J" in Roman letters and the consonant element "J" in English letters, and a pair of the consonant element "R" in Roman letters and the consonant element "L" in English letters.

Further, the rule information storage unit 15 stores, in addition to the consonant rule, an exclusion rule that indicates a condition under which a specific consonant element is excludable. In one example, it is assumed that the rule information storage unit 15 stores the exclusion rule which indicates a condition under which the consonant element "S" that appears in the English character string str2 (where the position of appearance is the end of the character string) is excludable.

In this case, the determination unit 14 compares the elements of the Roman array A and the elements of the English array B one by one from the first element by the same procedure as the procedure described in the first example. The determination unit 14 thereby determines that the consonant element "B" in the first element A[1] of the Roman array A and the consonant element "B" in the first element B[1] of the English array B have a correspondence, the consonant element "J" in the second element A[2] of the Roman array A and the consonant element "J" in the second element B[2] of the English array B have a correspondence, and the consonant element "R" in the third element A[3] of the Roman array A and the consonant element "L" in the third element B[3] of the English array B have a correspondence.

Comparisons are done for all elements of the Roman array A when a comparison between the third element A[3] of the Roman array A and the third element B[3] of the English array B ends. On the other hand, the fourth element B[4] (=["S" ""]) of the English array B remains. In this case, the determination unit 14 determines whether the consonant element in the fourth element B[4] is excludable from the target of comparisons by referring to the exclusion rule stored in the rule information storage unit 15.

As described above, the exclusion rule includes a rule indicating that the consonant element "S" which appears at the end of the English character string str2 is excludable. Further, the element B[4] has the consonant element "S", and it appears at the end of the English character string str2 (i.e., the last element of the English array B). Therefore, the determination unit 14 determines that the consonant element in the element B[4] matches the condition indicated by the exclusion rule, and excludes the element B[4] from the target of comparisons. As a result, it is determined that a consonant element included in each element of the Roman array A and a consonant element included in each element of the English array B have a correspondence for all elements other than the element B[4] that has been excluded from the target of comparisons. The determination unit 14 thereby determines that the Katakana word w1 and the English word w2 have a transliteration relationship.

Note that, although the case where an excludable consonant element appears in the last element B[4] of the English array B is described in the second example, an excludable consonant element may appear in an element other than the last element of the English array B. The case where an excludable consonant element appears in an element in the middle of the English array B is described in the third example which is described below.

(Third Example of Processing by the Determination Unit)

The third example corresponds to the case where the dividing unit 13 generates a pair of a Roman array and an English array corresponding to each of a plurality of dividing patterns. Specifically, in the third example, the determination unit 14 compares, for each of a plurality of dividing patterns, the elements of the Roman array and the elements of the English array one by one from the first element. When it is determined, for at least one dividing pattern, that a consonant element included in each element of the Roman array and a consonant element included in each element of the English array have a correspondence, the determination unit 14 determines that the Katakana word w1 and the English word w2 have a transliteration relationship.

The third example of the processing performed by the determination unit 14 is described hereinafter in detail using, as an example, the case shown in FIG. 6 (the case where the Katakana word w1 is "バスタオル" in Katakana and the English word w2 is "BATHTOWEL" in alphabet).

In this case, it is assumed that the consonant rule stored in the rule information storage unit 15 at least includes a rule indicating that a pair of the consonant element "B" in Roman letters and the consonant element "B" in English letters have a correspondence, and so do a pair of the consonant element "S" in Roman letters and the consonant element "TH" in English letters, a pair of the consonant element "T" in Roman letters and the consonant element "T" in English letters, and a pair of the consonant element "R" in Roman letters and the consonant element "L" in English letters. On the other hand, it is assumed that the consonant rule does not include a rule indicating that a pair of the consonant element "S" in Roman letters and the consonant element "THT" or "T" in English letters have a correspondence.

Further, it is assumed that the rule information storage unit 15 stores an exclusion rule that indicates a condition under which the consonant element "W" which appears in the English character string str2 (the consonant element having only the consonant letter "W") is excludable. On the other hand, it is assumed that the rule information storage unit 15 does not store an exclusion rule that indicates a condition under which the consonant elements "THT", "HT" and "T" which appear in the English character string str2 are excludable.

In the example of FIG. 6, the English arrays B1 to B4 are generated by the dividing unit 13 respectively for the four dividing patterns of the English character string str2 ("BATHTOWEL") obtained from the English word w2 as described earlier in the "Second example of processing by the dividing unit". Thus, the determination unit 14 performs the same processing as the processing described in the first example and the second example for all pairs of the Roman array A and the English arrays B1 to B4 (specifically, a pair of the Roman array A and the English array B1, a pair of the Roman array A and the English array B2, a pair of the Roman array A and the English array B3, and a pair of the Roman array A and the English array B4).

First, the determination unit 14 determines, for a pair of the Roman array A and the English array B1, whether a consonant element in each element of the Roman array A and a consonant element in each element of the English array B1 have a correspondence or not. In this case, in the comparison of the first elements, the determination unit 14 determines that the consonant element "B" in the element A[1] and the consonant element "B" in the element B1[1] have a correspondence.

On the other hand, in the comparison of the second elements, the determination unit 14 determines that the consonant element "S" in the element A[2] and the consonant element "THT" in the element B1[2] do not have a correspondence. Then, the determination unit 14 refers to the exclusion rule stored in the rule information storage unit 15 and determines whether the consonant element "THT" is excludable or not. The rule indicating a condition under which the consonant element "THT" is excludable is not included in the exclusion rule. Accordingly, the determination unit 14 determines that the element B1[2] is not excludable from the target of comparisons, and determines, for a pair of the Roman array A and the English array B1, that a consonant element included in each element of the Roman array A and a consonant element included in each element of the English array B1 do not have a correspondence.

Next, the determination unit 14 determines, for a pair of the Roman array A and the English array B2, whether a consonant element in each element of the Roman array A and a consonant element in each element of the English array B2 have a correspondence or not. In this case, in the comparison of the first elements, the determination unit 14 determines that the consonant element "B" in the element A[1] and the consonant element "B" in the element B2[1] have a correspondence. Further, in the comparison of the second elements also, the determination unit 14 determines that the consonant element "S" in the element A[2] and the consonant element "TH" in the element B2[2] have a correspondence. Further, in the comparison of the third elements also, the determination unit 14 determines that the consonant element "T" in the element A[3] and the consonant element "T" in the element B2[3] have a correspondence.

Then, in the comparison of the fourth elements, the determination unit 14 determines that the consonant element "R" in the element A[4] and the consonant element "W" in the element B2[4] do not have a correspondence. Then, the determination unit 14 refers to the exclusion rule stored in the rule information storage unit 15 and determines whether the consonant element "W" is excludable or not. The consonant element "W" in the element B2[4] matches the condition for exclusion indicated by the exclusion rule.

Accordingly, the determination unit 14 excludes the element B2[4] from the target of comparisons and then continues the comparison.

To be specific, the determination unit 14 selects the element B2[5] after the element B2[4] as a target to be compared with the element A[4], and compares the element A[4] and the element B2[5]. In this comparison, the determination unit 14 determines that the consonant element "R" in the element A[4] and the consonant element "L" in the element B2[5] have a correspondence. As a result, it is determined that a consonant element included in each element of the Roman array A and a consonant element included in each element of the English array B have a correspondence for all elements other than the element B2[4] that has been excluded from the target of comparisons. The determination unit 14 thereby determines, for a pair of the Roman array A and the English array B2, that a consonant element included in each element of the Roman array A and a consonant element included in each element of the English array B2 have a correspondence.

Then, the determination unit 14 determines, for at least one dividing pattern (i.e., a pair of the Roman array A and the English array B2), that the Katakana word w1 and the English word w2 have a transliteration relationship based on the determination that a consonant element included in each element of the Roman array A and a consonant element included in each element of the English array B have a correspondence.

Note that the determination unit 14 does not need to make comparisons for the remaining pairs (i.e., a pair of the Roman array A and the English array B3 and a pair of the Roman array A and the English array B4). Note that, however, comparisons for a pair of the Roman array A and the English array B3 and a pair of the Roman array A and the English array B4 are made in the case where those comparisons are made before or in parallel with a comparison of a pair of the Roman array A and the English array B2.

As described in the above example, in some cases, one consonant element consisting of a plurality of consonant letters in English ("THT" in the above example) corresponds to two or more consonant elements separated by a vowel element in Japanese in Roman letters ("S" and "T" in the above example). Therefore, by making a determination on each of a plurality of dividing patterns including a pattern that further divides a consonant element consisting of a plurality of consonant letters (the three dividing patterns for creating the English arrays B2, B3 and B4 in the above example) and a pattern that does not divide it (the dividing pattern for creating the English array B1 in the above example) as described in the above example, it is possible to accurately detect whether the Katakana word w1 and the English word w2 have a transliteration relationship.

(Fourth Example of Processing by the Determination Unit)

In the fourth example, the determination unit 14 further makes a determination based on a pair of a vowel element (first vowel element) included in the Roman character string str1 and a vowel element (second vowel element) included in the English character string str2. Then, the determination unit 14 determines whether the Katakana word w1 and the English word w2 have a transliteration relationship based also on a result of this determination. In this manner, by using results of comparisons between vowel elements in addition to comparisons between consonant elements described in the above first to third examples, it is possible to accurately determine whether the Katakana word w1 and the English word w2 have a transliteration relationship.

The processing in the fourth example by the determination unit 14 is described in detail. The determination unit 14 determines whether a predetermined prohibition rule (vowel rule) applies to each pair of a vowel element in each element of the Roman array A and a vowel element in each element of the English array B. The determination unit 14 may make such a determination by referring to the prohibition rule as shown in (b) of FIG. 7, for example. Such a prohibition rule may be stored in the above-described rule information storage unit 15 together with the consonant rule and the exclusion rule.

The prohibition rule shown in (b) of FIG. 7 is a rule indicating that the Katakana word w1 and the English word w2 do not have a transliteration relationship when a vowel element in the English character string str2 of the English word w2 which corresponds to the vowel element "U" in the Roman character string str1 of the Katakana word w1 is "A" or "I" (excluding "IU" or "IEU"). Such a prohibition rule can be created by defining a pair of vowel elements that do not usually appear in the Katakana word w1 and the English word w2 having a transliteration relationship.

As a specific example, comparisons between vowel elements in the case where the Katakana word w1 is "プリムール" in Katakana and the English word w2 is "PRIMEUR" are described. In this case, the Roman array A and the English array B are represented as follows as described above.
A={["P" "U"], ["R" "I"], ["M" "UU"], ["R" "U"]}
B={["P" " "], ["R" "I"], ["M" "EU"], ["R" " "]}

The determination unit 14 determines whether a pair of the vowel element "U" in the first element A[1] of the Roman array A and the vowel element " " (null) in the first element B[1] of the English array B fall under the prohibition rule or not. Likewise, the determination unit 14 determines whether a pair of the vowel element "I" in the element A[2] and the vowel element "I" in the element B[2], a pair of the vowel element "UU" in the element A[3] and the vowel element "EU" in the element B[3], and a pair of the vowel element "U" in the element A[4] and the vowel element " " in the element B[2] fall under the prohibition rule or not.

Because there is no pair of vowel elements that fall under the prohibition rule shown in (b) of FIG. 7 in this example, the determination unit 14 determines that a pair of a vowel element included in the Roman character string str1 and a vowel element included in the English character string str2 do not fall under the prohibition rule. In this case, the determination unit 14 determines that the Katakana word w1 and the English word w2 have a transliteration relationship based on a result of a determination by comparisons between consonant elements.

On the other hand, when there is a pair of vowel elements that fall under the prohibition rule in a determination between vowel elements, the determination unit 14 determines that a pair of a vowel element included in the Roman character string str1 and a vowel element included in the English character string str2 fall under the prohibition rule. In this case, the determination unit 14 determines that the Katakana word w1 and the English word w2 do not have a transliteration relationship regardless of a result of a determination by comparisons between consonant elements described above.

In this manner, the determination unit 14 may combine a determination by consonant elements and a determination by vowel elements, and determine that the Katakana word w1 and the English word w2 have a transliteration relationship when it is determined that the Katakana word w1 and the English word w2 have a transliteration relationship in both of the determinations. It is thereby possible to accurately determine whether the Katakana word w1 and the English word w2 have a transliteration relationship.

As the number of elements in a array (Roman array or English array) that are determined to have a correspondence by comparisons between consonant elements increases, the possibility that the Katakana word w1 and the English word w2 have a transliteration relationship increases; on the other hand, the possibility that it exceptionally falls under the prohibition rule in comparisons between vowel elements increases. Therefore, under the circumstances where there are a large number of elements that are determined to have a correspondence by comparisons between consonant elements, if it is determined that the Katakana word w1 and the English word w2 do not have a transliteration relationship based on the fact that the prohibition rule applies in a determination between vowel elements, the possibility of making a wrong determination that the Katakana word w1 and the English word w2 that actually have a transliteration relationship do not have a transliteration relationship increases.

On the other hand, as the number of elements in a array that are determined to have a correspondence by comparisons between consonant elements decreases, the possibility that the Katakana word w1 and the English word w2 have a transliteration relationship decreases; on the other hand, the possibility that it exceptionally falls under the prohibition rule in comparisons between vowel elements decreases. Therefore, by determining that the Katakana word w1 and the English word w2 do not have a transliteration relationship based on the fact that the prohibition rule applies in a determination between vowel elements under the circumstances where there are a small number of elements that are determined to have a correspondence by comparisons between consonant elements, it is possible to reduce the possibility of making a wrong determination that the Katakana word w1 and the English word w2 that actually do not have a transliteration relationship have a transliteration relationship.

Therefore, the determination unit 14 may carry out the above-described determination between vowel elements only when the number of elements in a array that are determined to have a correspondence by comparisons between consonant elements is equal to or less than a predetermined threshold. It is thereby possible to reduce the possibility of making a wrong determination that the Katakana word w1 and the English word w2 that actually do not have a transliteration relationship have a transliteration relationship as well as reducing the possibility of making a wrong determination that the Katakana word w1 and the English word w2 that actually have a transliteration relationship do not have a transliteration relationship.

The output unit 16 is a functional element that outputs, as a transliteration pair, the Katakana word w1 and the English word w2 that have been determined to have a transliteration relationship by the determination unit 14. The transliteration pair that is output by the output unit 16 is registered as one record data of the transliteration dictionary data T shown in FIG. 2, for example, and referred to by the information processing device 20.

The operation of the transliteration processing device 10 (including a transliteration processing method according to this embodiment) is described hereinafter with reference to FIGS. 8 and 9.

First, the word acquisition unit 11 acquires the Katakana word w1 and the English word w2 (Step S1; word acquisition step). Next, the character string acquisition unit 12 converts the Katakana word w1 into Roman letters and thereby acquires the Roman character string str1, and acquires the English word w2 as the English character string str2 without any conversion (Step S2; character string acquisition step).

Then, the dividing unit 13 divides each of the Roman character string str1 and the English character string str2 at the boundary where a vowel letter is followed by a consonant letter, and generates the Roman array A and the English array B (Step S3; dividing step). Note that, when the English character string str2 includes a consonant element consisting of a plurality of consonant letters as described earlier in the "Second example of processing by the dividing unit", English arrays (English arrays B2 to B4 in the example of FIG. 6) which correspond to the dividing patterns for further dividing the consonant element may be generated.

Then, the determination unit 14 carries out the processing of determining whether the Katakana word w1 and the English word w2 have a transliteration relationship based on the Roman array A and the English array B generated by the dividing unit 13 (Step S4; determination step). In the case where a plurality of English arrays (English arrays B1 to B4 in the example of FIG. 6) which correspond to a plurality of dividing patterns are generated by the dividing unit 13, the processing of Step S4 is performed for each pair of the Roman array A and the English arrays B1 to B4. The details of the processing in Step S4 are described later with reference to FIG. 9.

When the determination unit 14 determines that the Katakana word w1 and the English word w2 have a transliteration relationship (Yes in Step S5), the output unit 16 outputs the Katakana word w1 and the English word w2 as a transliteration pair (Step S6; output step). On the other hand, when the determination unit 14 does not determine that the Katakana word w1 and the English word w2 have a transliteration relationship (No in Step S5), the Katakana word w1 and the English word w2 are not output as a transliteration pair.

Note that, in Step S1, in the case where the word acquisition unit 11 acquires a plurality of one or both of the Katakana word w1 and the English word w2, the processing in Steps S2 to S5 may be performed for all pairs of the Katakana word w1 and the English word w2. It is thereby possible to automatically and efficiently detect transliteration pairs from the plurality of Katakana words w1 and English words w2 acquired by the word acquisition unit 11.

Figure 8:
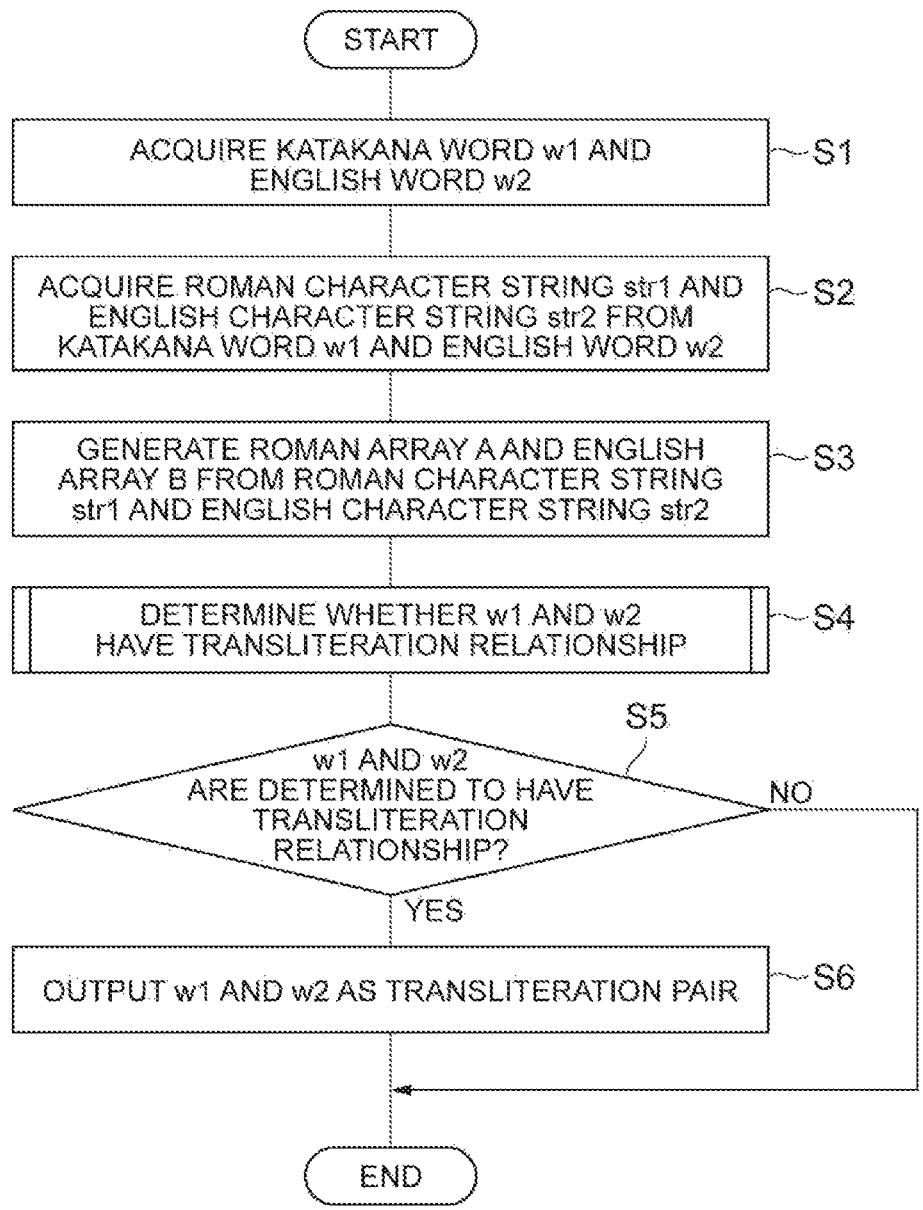
FIG. 8 is a flowchart showing the operation of a transliteration processing device according to an embodiment.

The details of the processing in Step S4 of FIG. 8 are described hereinafter with reference to FIG. 9. In this example, the processing that combines the processing described above in the first to fourth examples of the processing performed by the determination unit is described. Note that, however, the flowchart of FIG. 9 is just one example of a procedure that can be employed by the determination unit 14. In this example, the same example as the above-described "Third example of processing by the determination unit" is used in the following description for easier understanding. Specifically, the processing of the determination unit 14 is described using the case where the Roman array A and the English array B are the same as the Roman array A and the English array B2 shown in FIG. 6 as described below as an example. It is assumed that the consonant rule and the exclusion rule stored in the rule information storage unit 15 are the same as those in the above-described "Third example of processing by the determination unit".

A={["B" "A"], ["S" "U"], ["T" "AO"], ["R" "U"]}
B={["B" "A"], ["TH" " "], ["T" "O"], ["W" "E"], ["L" " "]}

First, before comparing a consonant element in each element of the Roman array A and a consonant element in each element of the English array B, the determination unit 14 initializes an internal counter (Step S101). A counter M indicates an element number of the Roman array A to be compared, a counter N indicates an element number of the English array B to be compared, and a score S indicates the number of elements that are determined to have a correspondence in comparisons between consonant elements. In Step S101, the counters M and N and the score S are initialized to "M=1, N=1, S=0".

Next, the determination unit 14 refers to the consonant rule stored in the rule information storage unit 15 and thereby determines whether the consonant element "B" in the element A[1] of the Roman array A and the consonant element "B" in the element B[1] of the English array B have a correspondence or not (Step S102). In this step, the determination unit 14 determines that the consonant element "B" in the element A[1] and the consonant element "B" in the element B[1] have a correspondence (Yes in Step S102). The determination unit 14 then adds 1 to the counters M and N and the score S (Step S103). The counters M and N and the score S are thereby updated to "M=2, N=2, S=1".

Then, because both of the element A[2] and the element B[2] exist (Yes in Step S104), the determination unit 14 determines whether consonant elements of the element A[2] and the element B[2] to be compared have a correspondence or not (Step S102). In this step, the determination unit 14 determines that the consonant element "S" in the element A[2] and the consonant element "TH" in the element B[2] have a correspondence (Yes in Step S102). The determination unit 14 then adds 1 to the counters M and N and the score S (Step S103). The counters M and N and the score S are thereby updated to "M=3, N=3, S=2".

Then, because both of the element A[3] and the element B[3] exist (Yes in Step S104), the determination unit 14 determines whether consonant elements of the element A[3] and the element B[3] to be compared have a correspondence or not (Step S102). In this step, the determination unit 14 determines that the consonant element "T" in the element A[3] and the consonant element "T" in the element B[3] have a correspondence (Yes in Step S102). The determination unit 14 then adds 1 to the counters M and N and the score S (Step S103). The counters M and N and the score S are thereby updated to "M=4, N=4, S=3".

Then, because both of the element A[4] and the element B[4] exist (Yes in Step S104), the determination unit 14 determines whether consonant elements of the element A[4] and the element B[4] to be compared have a correspondence or not (Step S102). In this step, the determination unit 14 determines that the consonant element "R" in the element A[4] and the consonant element "W" in the element B[4] do not have a correspondence (No in Step S102). Therefore, the determination unit 14 refers to the exclusion rule stored in the rule information storage unit 15 and thereby determines whether the consonant element in the element B[4] is excludable from the target of comparisons or not (Step S105).

Because the consonant element "W" in the element B[4] matches the condition indicated by the exclusion rule, the determination unit 14 determines that the consonant element in the element B[4] is excludable (Yes in Step S105). Then, the determination unit 14 adds 1 to the counter N and updates it to "N=5" in order to exclude the element B[4] from the target of comparisons (Step S106). The determination unit 14 then determines whether the next element B[5] exists or not (Step S107).

Because the element B[5] exists (Yes in Step S107), the determination unit 14 returns to Step S102 and determines whether the consonant element "R" in the element A[4] and the consonant element "L" in the element B[5] have a correspondence or not. In this step, the determination unit 14 determines that the consonant element "R" in the element A[4] and the consonant element "L" in the element B[5] have a correspondence (Yes in Step S102). The determination unit 14 then adds 1 to the counters M and N and the score S (Step S103). The counters M and N and the score S are thereby updated to "M=5, N=6, S=4".

Then, because both of the element A[5] and the element B[6] do not exist (No in Step S104, No in Step S108), the determination unit 14 determines, at this point, that the consonant element in each element of the Roman array A and the consonant element in each element of the English array B have a correspondence. After that, the determination unit 14 determines whether or not to determine a correspondence between vowel elements in the Roman array A and the English array B (Step S110).

As described above, in Step S110, the determination unit 14 can determine a correspondence between vowel elements when the score S is equal to or less than a predetermined threshold, for example. If the threshold is defined as "3", because the score S (=4) is greater than this threshold, the determination unit 14 determines that it does not determine a correspondence between vowel elements (No in Step S110). In this case, the determination unit 14 determines that the Katakana word w1 and the English word w2 have a transliteration relationship, and the process ends (Step S114).

The above-described specific examples are additionally described with reference to the flowchart shown in FIG. 9.

In Step S105, when it is not determined that a consonant element in the element B[N] is excludable (No in Step S105), the determination unit 14 determines that a determination between consonant elements has failed (in other words, a consonant element in each element of the Roman array A and a consonant element in each element of the English array B do not have a correspondence). In this case, the determination unit 14 determines that the Katakana word w1 and the English word w2 do not have a transliteration relationship, and the process ends (Step S113).

In Step S107, when the element B[N] does not exist (No in Step S107), it means that there is no element of the English array B to be compared with the element A[M] of the Roman array A. In this case, because at least a consonant element that corresponds to a consonant element in the element A[M] does not exist in the English array B, the determination unit 14 determines that a determination between consonant elements has failed. In this case, the determination unit 14 determines that the Katakana word w1 and the English word w2 do not have a transliteration relationship, and the process ends (Step S113).

In Step S108, when any one of the element A[M] and the element B[N] exists (Yes in Step S108), the determination unit 14 refers to the exclusion rule stored in the rule information storage unit 15 and thereby determines whether a consonant element in the remaining element is excludable or not (Step S109). For example, in the case of the above-described "Second example of processing by the determination unit" (in the example of FIG. 5), only the last element B[4] (=["S" " "]) in the English array B remains.

In such a case, when it is determined that a consonant element in the remaining element is excludable (Yes in Step S109), the determination unit 14 determines that the consonant element in each element of the Roman array A and the consonant element in each element of the English array B have a correspondence. After that, the determination unit 14 determines whether or not to determine a correspondence between vowel elements in the Roman array A and the English array B (Step S110).

On the other hand, when it is not determined that a consonant element in the remaining element is excludable (No in Step S109), the determination unit 14 determines that a determination between consonant elements has failed because it cannot make a comparison about a consonant element in the remaining element. In other words, the determination unit 14 determines that the Katakana word w1 and the English word w2 do not have a transliteration relationship, and the process ends (Step S113).

When it is determined in Step S110 to make a determination on a correspondence between vowel elements (Yes in Step S110), the determination unit 14 performs the processing as described in the above "Fourth example of processing by the determination unit". Specifically, the determination unit 14 refers to the prohibition rule stored in the rule information storage unit 15 and thereby determines whether the prohibition rule applies to each pair of a vowel element in each element of the Roman array A and a vowel element in each element of the English array B (Step S112). When it is determined that any of the pairs falls under the prohibition rule (Yes in Step S112), the determination unit 14 determines that the Katakana word w1 and the English word w2 do not have a transliteration relationship (Step S113). On the other hand, when it is determined that none of the pairs falls under the prohibition rule (No in Step S112), the determination unit 14 determines that the Katakana word w1 and the English word w2 have a transliteration relationship (Step S114).

Figure 10:
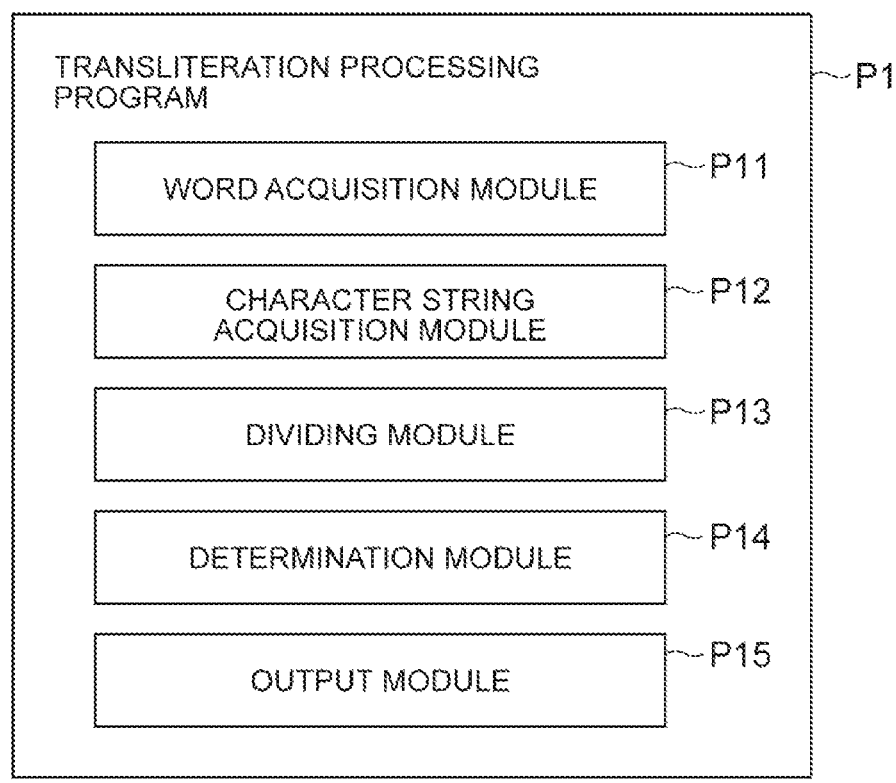
FIG. 10 is a view showing the structure of a transliteration processing program according to an embodiment.

A transliteration processing program P1 that causes the computer 100 to function as the transliteration processing device 10 is described hereinafter with reference to FIG. 10.

The transliteration processing program P1 includes a word acquisition module P11, a character string acquisition module P12, a dividing module P13, a determination module P14, and an output module P15. The functions implemented by executing the word acquisition module P11, the character string acquisition module P12, the dividing module P13, the determination module P14 and the output module P15 are respectively equal to the functions of the word acquisition unit 11, the character string acquisition unit 12, the dividing unit 13, the determination unit 14 and the output unit 16 described above.

The transliteration processing program P1 is provided in the form of being recorded in a static manner on a tangible recording medium such as CD-ROM, DVD-ROM or semiconductor memory, for example. Alternatively, the transliteration processing program P1 may be provided as a data signal superimposed onto a carrier wave through a communication network.

As described above, a transliteration processing device according to one aspect of the present invention includes a character string acquisition unit configured to acquire a first alphabetic character string that represents by alphabet a first word written in a first language having a specified script and a second alphabetic character string that represents by alphabet a second word written in a second language having a different script from the first language; a determination unit configured to make a determination as to whether a first consonant element included in the first alphabetic character string and a second consonant element included in the second alphabetic character string have a predetermined correspondence, and determine whether the first word and the second word have a transliteration relationship based on a result of the determination; and an output unit configured to output, as a transliteration pair, the first word and the second word determined to have a transliteration relationship by the determination unit.

A transliteration processing method according to one aspect of the present invention is a transliteration processing method performed by at least one processor, the method including a character string acquisition step of acquiring a first alphabetic character string that represents by alphabet a first word written in a first language having a specified script and a second alphabetic character string that represents by alphabet a second word written in a second language having a different script from the first language; a determination step of making a determination as to whether a first consonant element included in the first alphabetic character string and a second consonant element included in the second alphabetic character string have a predetermined correspondence, and determining whether the first word and the second word have a transliteration relationship based on a result of the determination; and an output step of outputting, as a transliteration pair, the first word and the second word determined to have a transliteration relationship in the determination step.

A transliteration processing program according to one aspect of the present invention causes a computer to execute a character string acquisition step of acquiring a first alphabetic character string that represents by alphabet a first word written in a first language having a specified script and a second alphabetic character string that represents by alphabet a second word written in a second language having a different script from the first language; a determination step of making a determination as to whether a first consonant element included in the first alphabetic character string and a second consonant element included in the second alphabetic character string have a predetermined correspondence, and determining whether the first word and the second word have a transliteration relationship based on a result of the determination; and an output step of outputting, as a transliteration pair, the first word and the second word determined to have a transliteration relationship in the determination step.

According to the above-described aspects, it is determined whether a first word written in a first language and a second word written in a second language have a transliteration relationship or not based on a result of a determination as to whether a first consonant element included in a first alphabetic character string and a second consonant element included in a second alphabetic character string have a predetermined correspondence. In this manner, by determining whether words described in languages having different scripts from each other have a transliteration relationship or not based on the correspondence between consonant elements included in alphabetic character strings that represent the respective words by alphabet, it is possible to efficiently detect transliteration pairs.

In a transliteration processing device according to another aspect, the determination unit may exclude a consonant element that matches a predetermined condition out of the first consonant element included in the first alphabetic character string and the second consonant element included in the second alphabetic character string, and make the determination on remaining consonant elements.

There is a case where, when the first word and the second word have a transliteration relationship, a consonant element corresponding to a consonant element that appears in the alphabetic character string of one word does not explicitly appear in the alphabetic character string of the other word. Thus, the determination unit extracts such a consonant element by a determination as to whether it matches a predetermined condition or not, and excludes the extracted consonant element, and can thereby more accurately determine whether the first word and the second word have a transliteration relationship.

A transliteration processing device according to another aspect may further include a dividing unit configured to divide the first alphabetic character string at a boundary where a vowel letter is followed by a consonant letter, generate a first array where divided elements are arranged in order of appearance in the first alphabetic character string, divide the second alphabetic character string at a boundary where a vowel letter is followed by a consonant letter, and generate a second array where divided elements are arranged in order of appearance in the second alphabetic character string, and the determination unit may compare elements of the first array and elements of the second array one by one from an element at the beginning of each array, and when it is determined that the first consonant element included in each element of the first array and the second consonant element included in each element of the second array have the predetermined correspondence, determine that the first word and the second word have a transliteration relationship.

When each consonant element included in the first alphabetic character string and each consonant element included in the second alphabetic character string have a correspondence, it is likely that the first word and the second word have a transliteration relationship. Thus, according to the above configuration, it is possible to easily sort out whether the first word and the second word have a transliteration relationship or not based on the correspondence between consonant elements, and it is thereby possible to efficiently detect transliteration pairs.

In a transliteration processing device according to another aspect, when an element including a consonant element consisting of a plurality of consonant letters exists among the divided elements, the dividing unit may generate the first array and the second array respectively corresponding to a plurality of dividing patterns including a pattern of further dividing the element into two or more elements and a pattern of not dividing the element, and the determination unit may compare, for each of the plurality of dividing patterns, elements of the first array and elements of the second array one by one from an element at the beginning of each array, and when it is determined, for at least one of the dividing patterns, that the first consonant element included in each element of the first array and the second consonant element included in each element of the second array have the predetermined correspondence, determine that the first word and the second word have a transliteration relationship.

In some cases, one consonant element consisting of a plurality of consonant letters included in one of the first alphabetic character string and the second alphabetic character string corresponds to two or more consonant elements separated by a vowel element in the other alphabetic character string. Thus, by making a determination on each of a plurality of dividing patterns including a pattern that further divides a consonant element consisting of a plurality of consonant letters and a pattern that does not divide it, it is possible to accurately detect whether the first word and the second word have a transliteration relationship.

In a transliteration processing device according to another aspect, the determination unit may further make a determination based on a pair of a first vowel element included in the first alphabetic character string and a second vowel element included in the second alphabetic character string, and determine whether the first word and the second word have a transliteration relationship based also on a result of the determination.

By using results of comparisons between vowel elements in addition to comparisons between consonant elements, it is possible to accurately determine whether the first word and the second word have a transliteration relationship.

A transliteration processing device according to another aspect may further include a word acquisition unit configured to acquire a word in Katakana contained in one web page as the first word and acquire a word in alphabet contained in the one web page as the second word, and pass the acquired first word and second word to the character string acquisition unit.

The text information contained in the same web page is likely to contain words that represent the same concept by each of Katakana and alphabet. In other words, the text information contained in the same web page is likely to contain a Katakana word and an alphabetical word having a transliteration relationship. Therefore, by acquiring the Katakana word and the alphabetical word contained in the same web page as the first word and the second word, respectively, it would be possible to efficiently detect transliteration pairs.

In a transliteration processing device according to another aspect, the one web page may be a web page that offers a product or a service on a web site selling products or services on the Internet, and the word acquisition unit may specify a portion where a name of a product or a service sold on the one web page is shown, acquire a word written in Katakana contained in the portion as the first word and acquire a word written in alphabet contained in the portion as the second word.

A web page that offers a product or a service on a web site selling products or services on the Internet, is sometimes provided with a portion where a name of the product or the service is shown. In the case where a product or service name is represented by Katakana (for example, when a product or service name is based on an object name represented by a loan word, a foreign place name, a foreign person name etc.), it is likely that the product or service name is written both in Katakana and alphabet in that portion. Therefore, by acquiring, from that portion, a Katakana word and an alphabetical word which are likely to have a transliteration relationship as the first word and the second word, respectively, it is possible to efficiently detect a transliteration pair.

An embodiment of the present invention is described in detail above. However, the present invention is not limited to the above-described embodiment. Various changes and modifications may be made to the present invention without departing from the scope of the invention.

Although the first and second examples are described as examples of the processing of the dividing unit 13, the dividing unit 13 may be configured to perform a part of the processing described in those examples. Further, although the first to fourth examples are described as examples of the processing of the determination unit 14, the determination unit 14 may be configured to perform a part of the processing described in those examples.

For example, the determination unit 14 is not necessarily configured to perform the processing of the second example (processing related to exclusion of a consonant element). In this case, the flow shown in FIG. 9 is replaced by a flow in which Steps S105 to S107 and Step S109 are omitted. In this case, when a determination in Step S108 results in Yes, the process proceeds to Step S113.

Further, the dividing unit 13 is not necessarily configured to perform the processing of the second example (processing of generating arrays respectively corresponding to a plurality of dividing patterns). Accordingly, the determination unit 14 is not necessarily configured to perform the processing of the third example (processing of making comparisons respectively corresponding to a plurality of dividing patterns).

Further, the determination unit 14 is not necessarily configured to perform the processing of the fourth example (processing of making a determination based on a pair of vowel elements). In this case, the flow shown in FIG. 9 is replaced by a flow in which Steps S110 to S112 are omitted.

In any of the alternative examples described above, it is possible to easily sort out whether the Katakana word w1 and the English word w2 have a transliteration relationship or not based on the correspondence between consonant elements, and it is thereby possible to efficiently detect transliteration pairs.

Figure 9:
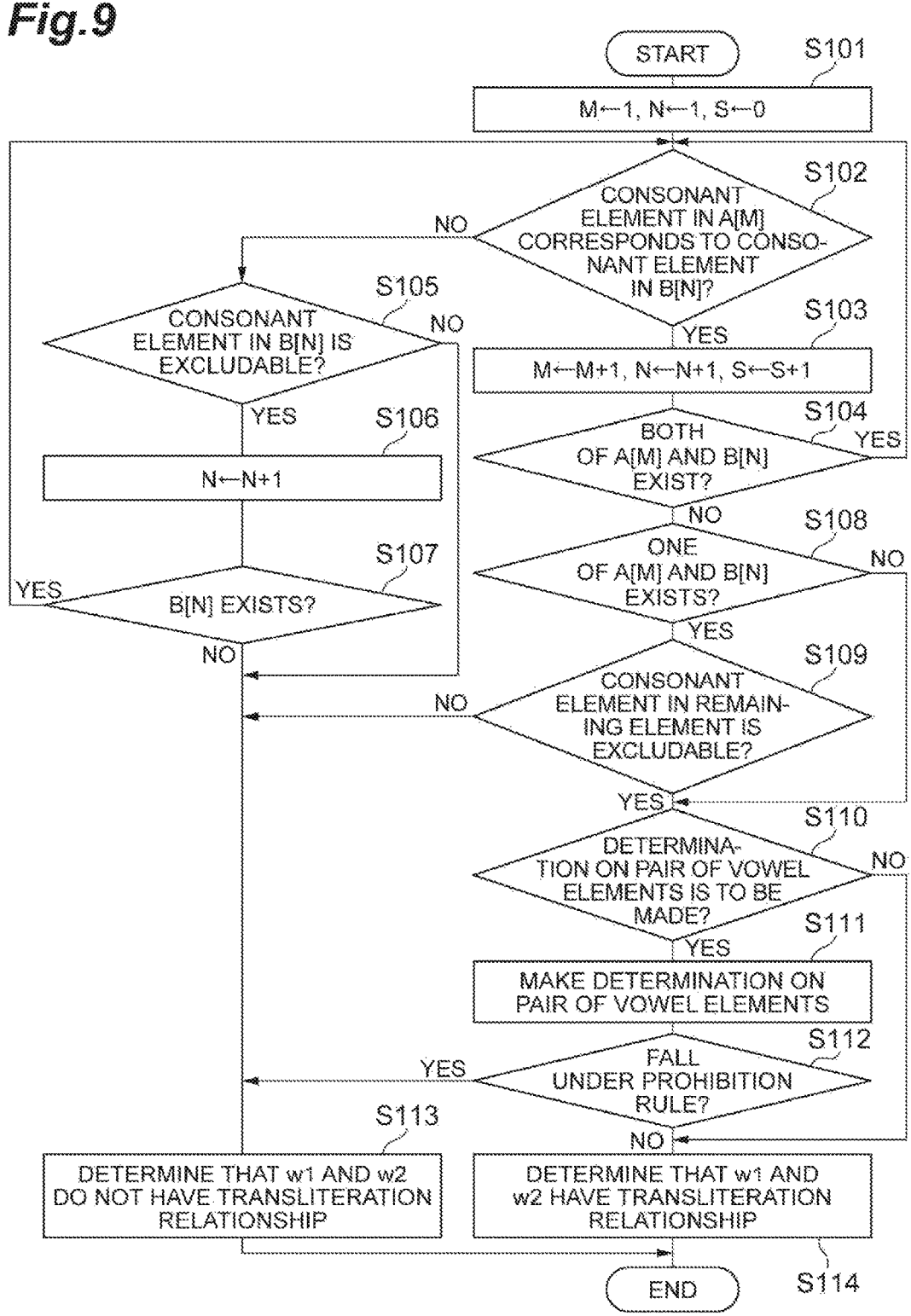
FIG. 9 is a flowchart showing the details of processing in Step S4 in FIG. 8.

Further, as described earlier, the procedure of the transliteration processing method that is performed by at least one processor is not limited to the example shown in FIGS. 8 and 9. For example, the transliteration processing device 10 may omit some of the steps (processing) in those figures or may perform the processing of those steps in a different order. Further, any two or more steps of the steps shown in those figures may be combined, or some of the steps may be modified or eliminated. Alternatively, the transliteration processing device 10 may perform another step in addition to the steps shown in those figures.

When comparing two numerical values in the information processing system 1, any one of "equal to or more than" and "more than" may be used, and any one of "equal to or less than" and "less than" may be used. Selection of those words would not change the technical significance regarding the processing of comparing two numerical values.

REFERENCE SIGNS LIST

1 . . . information processing system, 10 . . . transliteration processing device, 11 . . . word acquisition unit, 12 . . . character string acquisition unit, 13 . . . dividing unit, 14 . . . determination unit, 15 . . . rule information storage unit, 16 . . . output unit, 20 . . . information processing device, P1 . . . transliteration processing program, P11 . . . word acquisition module, P12 . . . character string acquisition module, P13 . . . dividing module, P14 . . . determination module, P15 . . . output module

The invention claimed is:

1. A transliteration processing device comprising:
at least one memory configured to store computer program code; and
at least one processor configured to access said at least one memory,
wherein the at least one processor is instructed by said computer program code to:
acquire a first alphabetic character string that represents by alphabet a first word written in a first language having a specified script and a second alphabetic character string that represents by alphabet a second word written in a second language having a different script from the first language;
divide the first alphabetic character string at a boundary where a vowel letter is followed by a consonant letter, generate a first array where divided elements are arranged in order of appearance in the first alphabetic character string, divide the second alphabetic character string at a boundary where a vowel letter is followed by a consonant letter, and generate a second array where divided elements are arranged in order of appearance in the second alphabetic character string, wherein, when an element including a consonant element consisting of a plurality of consonant letters exists among the divided elements, the first array and the second array are respectively generated corresponding to a plurality of dividing patterns including a pattern of further dividing the element into two or more elements and a pattern of not dividing the element;

compare, for each of the plurality of dividing patterns, elements of the first array and elements of the second array one by one from an element at the beginning of each array, and when it is determined, for at least one of the plurality of dividing patterns, that a first consonant element included in each element of the first array and a second consonant element included in each element of the second array have a predetermined correspondence, determine that the first word and the second word have a transliteration relationship; and generate a transliteration pair, which includes the first word and the second word determined to have the transliteration relationship and register, in transliteration dictionary data, the transliteration pair, wherein, in response to a search inquiry received from a user terminal, the search inquiry including the first word written in the first language:

the transliteration dictionary data is referred to so as to obtain the transliteration pair, including the first word and the second word determined to have the transliteration relationship, a search is performed among web pages accessible via Internet based on the first word and the second word, and a web page searched based on the first word as a keyword and a web page searched based on the second word as the keyword are returned and displayed on the user terminal as a search result in response to the search inquiry.

2. The transliteration processing device according to claim 1, wherein the at least one processor is instructed by said computer program code to:

exclude a consonant element that matches a predetermined condition out of the first consonant element included in the first alphabetic character string and the second consonant element included in the second alphabetic character string, and make a determination on remaining consonant elements.

3. The transliteration processing device according to claim 1, wherein the at least one processor is instructed by said computer program code to:

make a determination based on a pair of a first vowel element included in the first alphabetic character string and a second vowel element included in the second alphabetic character string, and determine whether the first word and the second word have the transliteration relationship based also on a result of the determination.

4. The transliteration processing device according to claim 1, the at least one processor operates is instructed by said computer program code to:

acquire a word in Katakana contained in one web page as the first word and acquire a word in alphabet contained in the one web page as the second word.

5. An information processing device that performs predetermined processing by referring to transliteration pairs generated by the transliteration processing device according to claim 1.

6. A transliteration processing method performed by at least one processor, comprising:

acquiring a first alphabetic character string that represents by alphabet a first word written in a first language having a specified script and a second alphabetic character string that represents by alphabet a second word written in a second language having a different script from the first language;

dividing the first alphabetic character string at a boundary where a vowel letter is followed by a consonant letter, generating a first array where divided elements are arranged in order of appearance in the first alphabetic character string, dividing the second alphabetic character string at a boundary where a vowel letter is followed by a consonant letter, and generating a second array where divided elements are arranged in order of appearance in the second alphabetic character string, wherein, when an element including a consonant element consisting of a plurality of consonant letters exists among the divided elements, the first array and the second array are respectively generated corresponding to a plurality of dividing patterns including a pattern of further dividing the element into two or more elements and a pattern of not dividing the element;

comparing, for each of the plurality of dividing patterns, elements of the first array and elements of the second array one by one from an element at the beginning of each array, and when it is determined, for at least one of the plurality of dividing patterns, that a first consonant element included in each element of the first array and a second consonant element included in each element of the second array have a predetermined correspondence, determining that the first word and the second word have a transliteration relationship; and generating a transliteration pair, which includes the first word and the second word determined to have the transliteration relationship and registering, in transliteration dictionary data, the transliteration pair, wherein, in response to a search inquiry received from a user terminal, the search inquiry including the first word written in the first language:

the transliteration dictionary data is referred to so as to obtain the transliteration pair, including the first word and the second word determined to have the transliteration relationship, a search is performed among web pages accessible via Internet based on the first word and the second word, and a web page searched based on the first word as a keyword and a web page searched based on the second word as the keyword are returned and displayed on the user terminal as a search result in response to the search inquiry.

7. A non-transitory computer readable medium storing a transliteration processing program causing a computer to:

acquire a first alphabetic character string that represents by alphabet a first word written in a first language having a specified script and a second alphabetic character string that represents by alphabet a second word written in a second language having a different script from the first language;

divide the first alphabetic character string at a boundary where a vowel letter is followed by a consonant letter, generate a first array where divided elements are arranged in order of appearance in the first alphabetic character string, divide the second alphabetic character string at a boundary where a vowel letter is followed by a consonant letter, and generate a second array where divided elements are arranged in order of appearance in the second alphabetic character string, wherein, when an element including a consonant element consisting of a plurality of consonant letters exists among the divided elements, the first array and the second array are respectively generated corresponding to a plurality of dividing patterns including a pattern of further dividing the element into two or more elements and a pattern of not dividing the element;

compare, for each of the plurality of dividing patterns, elements of the first array and elements of the second array one by one from an element at the beginning of each array, and when it is determined, for at least one of the plurality of dividing patterns, that a first consonant element included in each element of the first array and a second consonant element included in each element of the second array have a predetermined correspondence, determine that the first word and the second word have a transliteration relationship; and generate a transliteration pair, which includes the first word and the second word determined to have the transliteration relationship and register, in transliteration dictionary data, the transliteration pair, wherein, in response to a search inquiry received from a user terminal, the search inquiry including the first word written in the first language:

the transliteration dictionary data is referred to so as to obtain the transliteration pair, including the first word and the second word determined to have the transliteration relationship, a search is performed among web pages accessible via Internet based on the first word and the second word, and a web page searched based on the first word as a keyword and a web page searched based on the second word as the keyword are returned and displayed on the user terminal as a search result in response to the search inquiry.

\* \* \* \* \*